US011202183B2

(12) United States Patent
Rico Alvarino et al.

(10) Patent No.: US 11,202,183 B2
(45) Date of Patent: Dec. 14, 2021

(54) RETUNING FOR ENHANCED MACHINE TYPE COMMUNICATION

(71) Applicant: QUALCOMM Incorporated, San Diego, CA (US)

(72) Inventors: Alberto Rico Alvarino, San Diego, CA (US); Wanshi Chen, San Diego, CA (US); Seyed Ali Akbar Fakoorian, San Diego, CA (US); Hao Xu, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/187,586

(22) Filed: Jun. 20, 2016

(65) Prior Publication Data

US 2016/0381490 A1 Dec. 29, 2016

Related U.S. Application Data

(60) Provisional application No. 62/184,850, filed on Jun. 25, 2015, provisional application No. 62/188,367, (Continued)

(51) Int. Cl.
*H04W 4/00* (2018.01)
*H04W 4/70* (2018.01)
(Continued)

(52) U.S. Cl.
CPC ............. *H04W 4/70* (2018.02); *H04L 1/0068* (2013.01); *H04L 5/0048* (2013.01);
(Continued)

(58) Field of Classification Search
CPC ............... H04W 4/005; H04W 72/042; H04W 72/0453; H04L 5/0048
See application file for complete search history.

(56) References Cited

U.S. PATENT DOCUMENTS

2011/0243261 A1* 10/2011 Bienas ............. H04W 72/1215
375/260
2013/0322363 A1 12/2013 Chen et al.
(Continued)

FOREIGN PATENT DOCUMENTS

CN 102209315 A 10/2011
JP 2017519401 A 7/2017

OTHER PUBLICATIONS

CATT, "Further Discussion on Support of Narrowband Operation for MTC," 3GPP TSG-RAN WG4 Meeting #74bis, R4-151931, Rio De Janeiro, Brazil, Apr. 20-24, 2015, 2 pgs., XP050939127, 3rd Generation Partnership Project.
(Continued)

*Primary Examiner* — Ajit Patel
*Assistant Examiner* — Pamit Kaur
(74) *Attorney, Agent, or Firm* — Holland & Hart LLP

(57) ABSTRACT

Methods, systems, and devices for wireless communication are described. User equipment (UE) and base stations may support frequency hopping with fast retuning for enhanced machine type communication (eMTC). For example, a UE may need to retune portions of its receive or transmit chain to support operation on various frequency bands, and it may perform the retune within a few symbols. Both base station and UE may anticipate or account for the retuning delay and communicate accordingly. A base station may refrain from transmitting for a certain period of time, for example. A base station may also account for frequency hopping delays for uplink communications. Systems may employ other techniques to support eMTC. For example, UEs may leverage reference signal patterns in certain control channels for demodulation. In some cases, base stations may alter control channel transmissions to account for various types of UEs with in the system.

24 Claims, 27 Drawing Sheets

Related U.S. Application Data filed on Jul. 2, 2015, provisional application No. 62/295,102, filed on Feb. 14, 2016.

(51) Int. Cl.

| | |
|---|---|
| *H04L 5/00* | (2006.01) |
| *H04W 72/04* | (2009.01) |
| *H04L 1/00* | (2006.01) |
| *H04W 72/12* | (2009.01) |
| *H04B 1/7136* | (2011.01) |

(52) U.S. Cl.
CPC ..... *H04W 72/042* (2013.01); *H04W 72/0453* (2013.01); *H04W 72/1273* (2013.01); *H04B 2001/71365* (2013.01)

(56) References Cited

U.S. PATENT DOCUMENTS

| | | | | |
|---|---|---|---|---|
| 2014/0369242 | A1* | 12/2014 | Ng | H04L 5/0098 370/280 |
| 2015/0016377 | A1* | 1/2015 | Kim | H04B 7/2615 370/329 |
| 2016/0226639 | A1* | 8/2016 | Xiong | H04L 1/08 |
| 2017/0273077 | A1* | 9/2017 | Kim | H04W 76/27 |
| 2018/0035424 | A1* | 2/2018 | Sun | H04B 1/713 |
| 2018/0109286 | A1* | 4/2018 | Yao | H04B 1/7143 |
| 2018/0152924 | A1* | 5/2018 | Ouchi | H04W 48/10 |

OTHER PUBLICATIONS

Intel Corporation, "On eMTC UE Fast Retuning Time and Potential Benefit to the Network," 3GPP TSG-RAN WG4 Meeting #75, R4-153578, Fukuoka, Japan, May 25-29, 2015, 6 pgs., XP050977007, 3rd Generation Partnership Project.

ISA/EP, International Search Report and Written Opinion of the international Searching Authority, Int'l Application No. PCT/US2016/038561, Sep. 28, 2016, European Patent Office, Rijswijk, NL, 13 pgs.

NEC: "Retuning Symbols for FeMTC in Rel-14" [online], 3GPP TSG-RAN WG1 Meeting #86Bis, R1-1609156, Lisbon, Portugal, Oct. 10-14, 2016, 2 Pages, Retrieved from the Internet: http://www.3gpp.org/ftp/tsg_ran/WG1_RL1/TSGR1_86b/Docs/R1-1609156.zip.

\* cited by examiner

Control Information

RETUNING FOR ENHANCED MACHINE TYPE COMMUNICATION

CROSS REFERENCES

The present Application for Patent claims priority to U.S. Provisional Patent Application No. 62/184,850 by Rico Alvarino, et al., entitled "Retuning For Enhanced Machine Type Communication" filed Jun. 25, 2015, and U.S. Provisional Patent Application No. 62/188,367 by Rico Alvarino, et al, entitled, "Retuning For Enhanced Machine Type Communication" filed Jul. 2, 2015, and U.S. Provisional Patent Application No. 62/295,102 by Rico Alvarino, et al., entitled, "Retuning For Enhanced Machine Type Communication" filed Feb. 14, 2016, each of which is assigned to the assignee hereof and expressly incorporated by reference herein.

BACKGROUND

The following relates generally to wireless communication and more specifically to retuning for enhanced machine type communication (eMTC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple access communications system may include a number of base stations, each simultaneously supporting communication for multiple communication devices, which may be otherwise known as user equipment (UE).

In some wireless systems, the frequency of transmitted signals may be changed periodically. This frequency hopping may help achieve frequency diversity and may help avoid narrowband interference. In some cases, UEs may have a wideband operation capability and may receive the signal as the frequency is changed. But for some devices that have limited transmitting and receiving capability, wideband operation may not be supported. These types of devices may thus need to retune portions of their receivers or transmitters to support frequency hopping.

SUMMARY

User equipment (UE) and network equipment, such as base stations, may adjust their operation to support frequency hopping within a system. For example, a machine type communication (MTC) UE may need to retune portions of its receive or transmit chain to support operation on various frequency bands. This retuning may introduce a delay, which the MTC UE and a base station may account for; and the duration of the retuning can be significantly reduced (e.g., on the order of symbol periods) if both the base station and UE anticipate or account for delays. For example, a base station may refrain from transmitting for a certain period of time (e.g., one, two, or three symbol periods) to account for a MTC UE's retuning. In some cases, a base station may also account for frequency hopping delays for uplink communications. For instance, a base station may determine a retuning delay to decode uplink transmissions accordingly.

Systems may employ other techniques to support lower complexity devices, including techniques with coverage enhancements (CEs). For example, UEs may leverage reference signal patterns in certain control channels for demodulation. In some cases, base stations may alter control channel transmissions to account for various types of UEs within the system.

A method of wireless communication is described. The method may include transmitting a first uplink message during a transmission time interval (TTI) in a first frequency band of a system bandwidth, retuning a transmitter to a second frequency band of the system bandwidth during a first portion of a second TTI, and transmitting a second uplink message during a second portion of the second TTI in the second frequency band.

An apparatus for wireless communication is described. The apparatus may include means for transmitting a first uplink message during a TTI in a first frequency band of a system bandwidth, means for retuning a transmitter to a second frequency band of the system bandwidth during a first portion of a second TTI, and means for transmitting a second uplink message during a second portion of the second TTI in the second frequency band.

A further apparatus for wireless communication is described. The apparatus may include a processor, memory in electronic communication with the processor, and instructions stored in the memory and operable, when executed by the processor, to cause the apparatus to transmit a first uplink message during a TTI in a first frequency band of a system bandwidth, retune a transmitter to a second frequency band of the system bandwidth during a first portion of a second TTI, and transmit a second uplink message during a second portion of the second TTI in the second frequency band.

A non-transitory computer-readable medium storing code for wireless communication is described. The code may include instructions executable to transmit a first uplink message during a TTI in a first frequency band of a system bandwidth, retune a transmitter to a second frequency band of the system bandwidth during a first portion of a second TTI, and transmit a second uplink message during a second portion of the second TTI in the second frequency band.

In some examples of the method, apparatuses, or non-transitory computer-readable medium described herein, a duration of the first portion of the second TTI is based at least in part on a longest retuning time among UEs operating with the system bandwidth. Additionally or alternatively, some examples may include processes, features, means, or instructions for transmitting the second uplink message comprises rate-matching around the first portion of a second TTI.

In some examples of the method, apparatuses, or non-transitory computer-readable medium described herein, a duration of the first portion of the second TTI is based at least in part on a retuning capability of the transmitter. Additionally or alternatively, in some examples the second portion of the second TTI is punctured by the first portion of the second TTI.

Some examples of the method, apparatuses, or non-transitory computer-readable medium described herein may further include processes, features, means, or instructions for transmitting a demodulation reference signal (DMRS) in third portion of the second TTI, where the third portion follows the first portion and precedes the second portion of the second TTI. Additionally or alternatively, some examples may include processes, features, means, or instructions for transmitting signaling indicative of a retuning capability, wherein a duration of the first portion of the second TTI is based at least in part on the retuning capability.

Some examples of the method, apparatuses, or non-transitory computer-readable medium described herein may further include processes, features, means, or instructions for identifying a CE requirement, and determining a duration of the first portion of the second TTI based at least in part on the CE requirement.

A method of wireless communication is described. The method may include receiving a first downlink message during a first TTI in a first frequency band of a system bandwidth, retuning a receiver to a second frequency band of the system bandwidth during a first portion of a second TTI, and receiving a second downlink message during a second portion of the second TTI in the second frequency band.

An apparatus for wireless communication is described. The apparatus may include means for receiving a first downlink message during a first TTI in a first frequency band of a system bandwidth, means for retuning a receiver to a second frequency band of the system bandwidth during a first portion of a second TTI, and means for receiving a second downlink message during a second portion of the second TTI in the second frequency band.

A further apparatus for wireless communication is described. The apparatus may include a processor, memory in electronic communication with the processor, and instructions stored in the memory and operable, when executed by the processor, to cause the apparatus to receive a first downlink message during a first TTI in a first frequency band of a system bandwidth, retune a receiver to a second frequency band of the system bandwidth during a first portion of a second TTI, and receive a second downlink message during a second portion of the second TTI in the second frequency band.

A non-transitory computer-readable medium storing code for wireless communication is described. The code may include instructions executable to receive a first downlink message during a first TTI in a first frequency band of a system bandwidth, retune a receiver to a second frequency band of the system bandwidth during a first portion of a second TTI, and receive a second downlink message during a second portion of the second TTI in the second frequency band.

In some examples of the method, apparatuses, or non-transitory computer-readable medium described herein, the first portion of the second TTI comprises a control region and part of a data region of the second TTI. Additionally or alternatively, some examples may include processes, features, means, or instructions for determining that the first portion of the second TTI comprises part of the second downlink message, and decoding the second downlink message based at least in part on an assumption that the second downlink message is punctured by symbols comprising other data.

Some examples of the method, apparatuses, or non-transitory computer-readable medium described herein may further include processes, features, means, or instructions for transmitting signaling indicative of a retuning capability, wherein a duration of the first portion of the second TTI is based at least in part on the retuning capability. Additionally or alternatively, in some examples the second downlink message is rate-matched around the first downlink message.

In some examples of the method, apparatus, or non-transitory computer-readable medium described above, the first portion of the second TTI comprises an initial symbol period of the second TTI, and wherein the method comprises receiving reference signals in symbols of the second TTI other than the initial symbol period of the second TTI.

Some examples of the method, apparatus, or non-transitory computer-readable medium described above may further include processes, features, means, or instructions for performing channel estimation, frequency tracking, or time tracking using a reference signals of the TTI, wherein a pattern of the reference signals is based at least in part on the designation of the TTI as being for tuning from the first to the second frequency band.

Some examples of the method, apparatus, or non-transitory computer-readable medium described above may further include processes, features, means, or instructions for receiving signaling indicating that the second TTI is designated for tuning from the first frequency band of the system bandwidth to the second frequency band of the system bandwidth.

In some examples of the method, apparatus, or non-transitory computer-readable medium described above, the signaling comprises system information.

A method of wireless communication is described. The method may include receiving a downlink control channel during a first TTI, the downlink control channel comprising a DMRS pattern, receiving a downlink data channel during a second TTI, and demodulating data of the downlink data channel using at least the DMRS pattern of the downlink control channel.

An apparatus for wireless communication is described. The apparatus may include means for receiving a downlink control channel during a first TTI, the downlink control channel comprising a DMRS pattern, means for receiving a downlink data channel during a second TTI, and means for demodulating data of the downlink data channel using at least the DMRS pattern of the downlink control channel.

A further apparatus for wireless communication is described. The apparatus may include a processor, memory in electronic communication with the processor, and instructions stored in the memory and operable, when executed by the processor, to cause the apparatus to receive a downlink control channel during a first TTI, the downlink control channel comprising a DMRS pattern, receive a downlink data channel during a second TTI, and demodulate data of the downlink data channel using at least the DMRS pattern of the downlink control channel.

A non-transitory computer-readable medium storing code for wireless communication is described. The code may include instructions executable to receive a downlink control channel during a first TTI, the downlink control channel comprising a DMRS pattern, receive a downlink data channel during a second TTI, and demodulate data of the downlink data channel using at least the DMRS pattern of the downlink control channel.

Some examples of the method, apparatuses, or non-transitory computer-readable medium described herein may further include processes, features, means, or instructions for determining a precoding matrix for the downlink channel, wherein the data is demodulated using at least a cell-specific reference signals (CRS) pattern of the downlink control channel and the CRS pattern of a downlink data channel.

A method of wireless communication is described. The method may include communicating with a base station during a portion of a first TTI that comprises a physical uplink control channel (PUCCH) with shortened format and resources scheduled for a different UE in a first frequency band, retuning to a second frequency band during a duration of the PUCCH, and communicating with the base station during a portion of a second TTI in the second frequency band.

An apparatus for wireless communication is described. The apparatus may include means for communicating with a base station during a portion of a first TTI that comprises a PUCCH with shortened format and resources scheduled for a different UE in a first frequency band, means for retuning to a second frequency band during a duration of the PUCCH, and means for communicating with the base station during a portion of a second TTI in the second frequency band.

A further apparatus for wireless communication is described. The apparatus may include a processor, memory in electronic communication with the processor, and instructions stored in the memory and operable, when executed by the processor, to cause the apparatus to communicate with a base station during a portion of a first TTI that comprises a PUCCH with shortened format and resources scheduled for a different UE in a first frequency band, retune to a second frequency band during a duration of the PUCCH, and communicate with the base station during a portion of a second TTI in the second frequency band.

A non-transitory computer-readable medium storing code for wireless communication is described. The code may include instructions executable to communicate with a base station during a portion of a first TTI that comprises a PUCCH with shortened format and resources scheduled for a different UE in a first frequency band, retune to a second frequency band during a duration of the PUCCH, and communicate with the base station during a portion of a second TTI in the second frequency band.

A method of wireless communication is described. The method may include transmitting a first downlink message to a UE during a first TTI in a first frequency band of a system bandwidth, refraining from transmitting to the UE during a first portion of a second TTI to account for retuning by the UE, and transmitting a second downlink message to the UE during a second portion of the second TTI in a second frequency band.

An apparatus for wireless communication is described. The apparatus may include means for transmitting a first downlink message to a UE during a first TTI in a first frequency band of a system bandwidth, means for refraining from transmitting to the UE during a first portion of a second TTI to account for retuning by the UE, and means for transmitting a second downlink message to the UE during a second portion of the second TTI in a second frequency band.

A further apparatus for wireless communication is described. The apparatus may include a processor, memory in electronic communication with the processor, and instructions stored in the memory and operable, when executed by the processor, to cause the apparatus to transmit a first downlink message to a UE during a first TTI in a first frequency band of a system bandwidth, refrain from transmitting to the UE during a first portion of a second TTI to account for retuning by the UE, and transmit a second downlink message to the UE during a second portion of the second TTI in a second frequency band.

A non-transitory computer-readable medium storing code for wireless communication is described. The code may include instructions executable to transmit a first downlink message to a UE during a first TTI in a first frequency band of a system bandwidth, refrain from transmitting to the UE during a first portion of a second TTI to account for retuning by the UE, and transmit a second downlink message to the UE during a second portion of the second TTI in a second frequency band.

Some examples of the method, apparatuses, or non-transitory computer-readable medium described herein may further include processes, features, means, or instructions for determining a duration of the first portion of the second TTI based at least in part on a specified retuning time among UEs. Additionally or alternatively, in some examples the first portion of the second TTI comprises a control region and part of a data region of the second TTI.

Some examples of the method, apparatuses, or non-transitory computer-readable medium described herein may further include processes, features, means, or instructions for transmitting the second downlink message comprises rate-matching around the first portion of a second TTI. Additionally or alternatively, some examples may include processes, features, means, or instructions for determining that a duration of the first portion of the second TTI comprises a control region of the second TTI.

Some examples of the method, apparatuses, or non-transitory computer-readable medium described herein may further include processes, features, means, or instructions for receiving signaling from the UE indicative of a retuning capability, and determining a duration of the first portion of the second TTI based at least in part on the retuning capability. Additionally or alternatively, some examples may include processes, features, means, or instructions for identifying a CE requirement for the UE, and determining a duration of the first portion of the second TTI based at least in part on the CE requirement.

A method of wireless communication is described. The method may include receiving a first uplink message from a UE during a first TTI in a first frequency band of a system bandwidth, receiving a second uplink message from the UE during a second TTI in a second frequency band of the system bandwidth, determining a duration for the UE to retune from the first frequency band to the second frequency band, and decoding the second uplink message based at least in part on the determined duration.

An apparatus for wireless communication is described. The apparatus may include means for receiving a first uplink message from a UE during a first TTI in a first frequency band of a system bandwidth, means for receiving a second uplink message from the UE during a second TTI in a second frequency band of the system bandwidth, means for determining a duration for the UE to retune from the first frequency band to the second frequency band, and means for decoding the second uplink message based at least in part on the determined duration.

A further apparatus for wireless communication is described. The apparatus may include a processor, memory in electronic communication with the processor, and instructions stored in the memory and operable, when executed by the processor, to cause the apparatus to receive a first uplink message from a UE during a first TTI in a first frequency band of a system bandwidth, receive a second uplink message from the UE during a second TTI in a second frequency band of the system bandwidth, determine a duration for the UE to retune from the first frequency band to the second frequency band, and decode the second uplink message based at least in part on the determined duration.

A non-transitory computer-readable medium storing code for wireless communication is described. The code may include instructions executable to receive a first uplink message from a UE during a first TTI in a first frequency band of a system bandwidth, receive a second uplink message from the UE during a second TTI in a second frequency band of the system bandwidth, determine a duration for the UE to retune from the first frequency band to the second frequency band, and decode the second uplink message based at least in part on the determined duration.

In some examples of the method, apparatuses, or non-transitory computer-readable medium described herein, determining the duration for the UE to retune comprises determining the duration based at least in part on a longest retuning time among UEs operating within the system bandwidth. Additionally or alternatively, some examples may include processes, features, means, or instructions for monitoring for the second uplink message during a first portion of the second TTI, and detecting part of the second uplink message within the first portion of the second TTI, wherein determining the duration for the UE to retune is based at least in part on detecting the part of the second uplink message.

Some examples of the method, apparatuses, or non-transitory computer-readable medium described herein may further include processes, features, means, or instructions for monitoring for a DMRS during a first portion of the second TTI, and detecting the second uplink message based at least in part on receiving the DRMS in the first portion of the second TTI, wherein determining the duration for the UE to retune is based at least in part on receiving the DMRS, and wherein the second uplink message is received during a second portion of the second TTI. Additionally or alternatively, some examples may include processes, features, means, or instructions for receiving signaling from the UE, the signaling indicative of the duration for the UE to retune, wherein the duration is determined based at least in part on the signaling.

Some examples of the method, apparatuses, or non-transitory computer-readable medium described herein may further include processes, features, means, or instructions for identifying a CE requirement for the UE, wherein the duration for the UE to retune is determined based at least in part on the CE requirement. Additionally or alternatively, in some examples the second uplink message is rate-matched around the first downlink message.

A method of wireless communication is described. The method may include transmitting a downlink control channel during a first TTI, the downlink control channel comprising a DMRS pattern and transmitted using a precoder, and transmitting a downlink data channel during a second TTI, wherein the downlink data channel is transmitted using the precoder.

An apparatus for wireless communication is described. The apparatus may include means for transmitting a downlink control channel during a first TTI, the downlink control channel comprising a DMRS pattern and transmitted using a precoder, and means for transmitting a downlink data channel during a second TTI, wherein the downlink data channel is transmitted using the precoder.

A further apparatus for wireless communication is described. The apparatus may include a processor, memory in electronic communication with the processor, and instructions stored in the memory and operable, when executed by the processor, to cause the apparatus to transmit a downlink control channel during a first TTI, the downlink control channel comprising a DMRS pattern and transmitted using a precoder, and transmit a downlink data channel during a second TTI, wherein the downlink data channel is transmitted using the precoder.

A non-transitory computer-readable medium storing code for wireless communication is described. The code may include instructions executable to transmit a downlink control channel during a first TTI, the downlink control channel comprising a DMRS pattern and transmitted using a precoder, and transmit a downlink data channel during a second TTI, wherein the downlink data channel is transmitted using the precoder.

A method of wireless communication is described. The method may include transmitting signaling indicative of a control channel format to a UE, determining that a control signal exceeds the control channel format, and transmitting a data signal to the UE, wherein the data signal is punctured by a portion of the control signal.

An apparatus for wireless communication is described. The apparatus may include means for transmitting signaling indicative of a control channel format to a UE, means for determining that a control signal exceeds the control channel format, and means for transmitting a data signal to the UE, wherein the data signal is punctured by a portion of the control signal.

A further apparatus for wireless communication is described. The apparatus may include a processor, memory in electronic communication with the processor, and instructions stored in the memory and operable, when executed by the processor, to cause the apparatus to transmit signaling indicative of a control channel format to a UE, determine that a control signal exceeds the control channel format, and transmit a data signal to the UE, wherein the data signal is punctured by a portion of the control signal.

A non-transitory computer-readable medium storing code for wireless communication is described. The code may include instructions executable to transmit signaling indicative of a control channel format to a UE, determine that a control signal exceeds the control channel format, and transmit a data signal to the UE, wherein the data signal is punctured by a portion of the control signal.

In some examples of the method, apparatuses, or non-transitory computer-readable medium described herein, transmitting the data signal comprises transmitting a power-boosted data signal.

A method of wireless communication is described. The method may include determining that a portion of a first TTI that comprises a shortened PUCCH, communicating with a second UE during the portion of the first TTI in the first frequency band based at least in part on the determination, and communicating with the second UE during a portion of a second TTI in a second frequency band based at least in part on the determination.

An apparatus for wireless communication is described. The apparatus may include means for determining that a portion of a first TTI that comprises a shortened PUCCH, means for communicating with a second UE during the portion of the first TTI in the first frequency band based at least in part on the determination, and means for communicating with the second UE during a portion of a second TTI in a second frequency band based at least in part on the determination.

A further apparatus for wireless communication is described. The apparatus may include a processor, memory in electronic communication with the processor, and instructions stored in the memory and operable, when executed by the processor, to cause the apparatus to determine that a portion of a first TTI that comprises a shortened PUCCH, communicate with a second UE during the portion of the first TTI in the first frequency band based at least in part on the determination, and communicate with the second UE during a portion of a second TTI in a second frequency band based at least in part on the determination.

A non-transitory computer-readable medium storing code for wireless communication is described. The code may include instructions executable to determine that a portion of a first TTI that comprises a shortened PUCCH, communicate with a second UE during the portion of the first TTI in the first frequency band based at least in part on the determination, and communicate with the second UE during a portion of a second TTI in a second frequency band based at least in part on the determination.

A further method of wireless communication is described. The method may include determining that a TTI is designated for tuning from a first frequency band of a system bandwidth to a second frequency band of the system bandwidth, tuning from the first frequency band to the second frequency band during an initial symbol period of the TTI, and receiving reference signals in symbols of the TTI other than the initial symbol period of the TTI.

A further apparatus for wireless communication is described. The apparatus may include means for determining that a TTI is designated for tuning from a first frequency band of a system bandwidth to a second frequency band of the system bandwidth, means for tuning from the first frequency band to the second frequency band during an initial symbol period of the TTI, and means for receiving reference signals in symbols of the TTI other than the initial symbol period of the TTI.

A further apparatus for wireless communication is described. The apparatus may include a processor, memory in electronic communication with the processor, and instructions stored in the memory and operable, when executed by the processor, to cause the apparatus to determine that a TTI is designated for tuning from a first frequency band of a system bandwidth to a second frequency band of the system bandwidth, tune from the first frequency band to the second frequency band during an initial symbol period of the TTI, and receive reference signals in symbols of the TTI other than the initial symbol period of the TTI.

A non-transitory computer-readable medium storing code for wireless communication is described. The code may include instructions executable to determine that a TTI is designated for tuning from a first frequency band of a system bandwidth to a second frequency band of the system bandwidth, tune from the first frequency band to the second frequency band during an initial symbol period of the TTI, and receive reference signals in symbols of the TTI other than the initial symbol period of the TTI.

Some examples of the method, apparatuses, or non-transitory computer-readable medium described herein may further include processes, features, means, or instructions for performing channel estimation, frequency tracking, or time tracking using a reference signals of the TTI, wherein a pattern of the reference signals is based at least in part on the designation of the TTI as being for tuning from the first to the second frequency band. Additionally or alternatively, some examples may include processes, features, means, or instructions for demodulating data received during the TTI using CRS or DMRS based at least in part on the determination that the TTI is designated for tuning from the first to the second frequency band.

Some examples of the method, apparatuses, or non-transitory computer-readable medium described herein may further include processes, features, means, or instructions for receiving signaling indicating that the TTI is designated for tuning from the first to the second frequency band.

Additionally or alternatively, in some examples, the signaling comprises system information.

A further method of wireless communication is described. The method may include determining that a TTI is designated for tuning from a first frequency band of a system bandwidth to a second frequency band of the system bandwidth, and transmitting reference signals in symbols of the TTI other than the initial symbol period of the TTI.

A further apparatus for wireless communication is described. The apparatus may include means for determining that a TTI is designated for tuning from a first frequency band of a system bandwidth to a second frequency band of the system bandwidth, and means for transmitting reference signals in symbols of the TTI other than the initial symbol period of the TTI.

A further apparatus for wireless communication is described. The apparatus may include a processor, memory in electronic communication with the processor, and instructions stored in the memory and operable, when executed by the processor, to cause the apparatus to determine that a TTI is designated for tuning from a first frequency band of a system bandwidth to a second frequency band of the system bandwidth, and transmit reference signals in symbols of the TTI other than the initial symbol period of the TTI.

A non-transitory computer-readable medium storing code for wireless communication is described. The code may include instructions executable to determine that a TTI is designated for tuning from a first frequency band of a system bandwidth to a second frequency band of the system bandwidth, and transmit reference signals in symbols of the TTI other than the initial symbol period of the TTI.

A further method of wireless communication is described. The method may include transmitting a first message during a first TTI in a first frequency band of a system bandwidth, retuning a transmitter to a second frequency band of the system bandwidth during a second TTI, and transmitting a second message during a third TTI in the second frequency band.

A further apparatus for wireless communication is described. The apparatus may include means for transmitting a first message during a first TTI in a first frequency band of a system bandwidth, means for retuning a transmitter to a second frequency band of the system bandwidth during a second TTI, and means for transmitting a second message during a third TTI in the second frequency band.

A further apparatus for wireless communication is described. The apparatus may include a processor, memory in electronic communication with the processor, and instructions stored in the memory and operable, when executed by the processor, to cause the apparatus to transmit a first message during a first TTI in a first frequency band of a system bandwidth, retune a transmitter to a second frequency band of the system bandwidth during a second TTI, and transmit a second message during a third TTI in the second frequency band.

A further non-transitory computer-readable medium storing code for wireless communication is described. The code may include instructions executable to transmit a first message during a first TTI in a first frequency band of a system bandwidth, retune a transmitter to a second frequency band of the system bandwidth during a second TTI, and transmit a second message during a third TTI in the second frequency band.

In some examples, the second message is transmitted without rate-matching around resource of the third TTI or another TTI. Some examples of the method, apparatuses, or non-transitory computer-readable medium described herein may further include processes, features, means, or instructions for determining that the second TTI comprises a time interval for a receiving device to perform frequency hopping operation, wherein the transmitter is retuned during the second TTI based at least in part on the determination. In some examples, the frequency hopping operation comprises a retuning operation at the receiving device.

Some examples of the method, apparatuses, or non-transitory computer-readable medium described herein may further include processes, features, means, or instructions for determining that the first TTI and the third TTI are configured for a first transmission direction, and determining that the second TTI is configured for a second transmission direction that is opposite from the first transmission direction, wherein the transmitter is retuned during the second TTI based at least in part on the determination that the second TTI is configured for the second transmission direction. In some examples, the first transmission direction and the second transmission direction each comprise one of an uplink transmission direction or a downlink transmission direction.

A further method of wireless communication is described. The method may include receiving a first message during a first TTI in a first frequency band of a system bandwidth, retuning a receiver to a second frequency band of the system bandwidth during a second TTI, and receiving a second message during a third TTI in the second frequency band.

A further apparatus for wireless communication is described. The apparatus may include means for receiving a first message during a first TTI in a first frequency band of a system bandwidth, means for retuning a receiver to a second frequency band of the system bandwidth during a second TTI, and means for receiving a second message during a third TTI in the second frequency band.

A further apparatus for wireless communication is described. The apparatus may include a processor, memory in electronic communication with the processor, and instructions stored in the memory and operable, when executed by the processor, to cause the apparatus to receive a first message during a first TTI in a first frequency band of a system bandwidth, retune a receiver to a second frequency band of the system bandwidth during a second TTI, and receive a second message during a third TTI in the second frequency band.

A further non-transitory computer-readable medium storing code for wireless communication is described. The code may include instructions executable to receive a first message during a first TTI in a first frequency band of a system bandwidth, retune a receiver to a second frequency band of the system bandwidth during a second TTI, and receive a second message during a third TTI in the second frequency band.

In some examples, the second message is received without rate-matching around resource of the third TTI or another TTI. Some examples of the method, apparatuses, or non-transitory computer-readable medium described herein may further include processes, features, means, or instructions for determining that the second TTI comprises a time interval to a perform frequency hopping operation, wherein the receiver is retuned during the second TTI based at least in part on the determination. In some examples, the frequency operation comprises retuning the receiver.

Some examples of the method, apparatuses, or non-transitory computer-readable medium described herein may further include processes, features, means, or instructions for determining that the first TTI and the third TTI are configured for a first transmission direction, and determining that the second TTI is configured for a second transmission direction that is opposite from the first transmission direction, wherein the receiver is retuned during the second TTI based at least in part on the determination that the second TTI is configured for the second transmission direction. In some examples, the first transmission direction and the second transmission direction each comprise one of an uplink transmission direction or a downlink transmission direction.

BRIEF DESCRIPTION OF THE DRAWINGS

Aspects of the disclosure are described in reference to the following figures.

DETAILED DESCRIPTION

Figure 1:
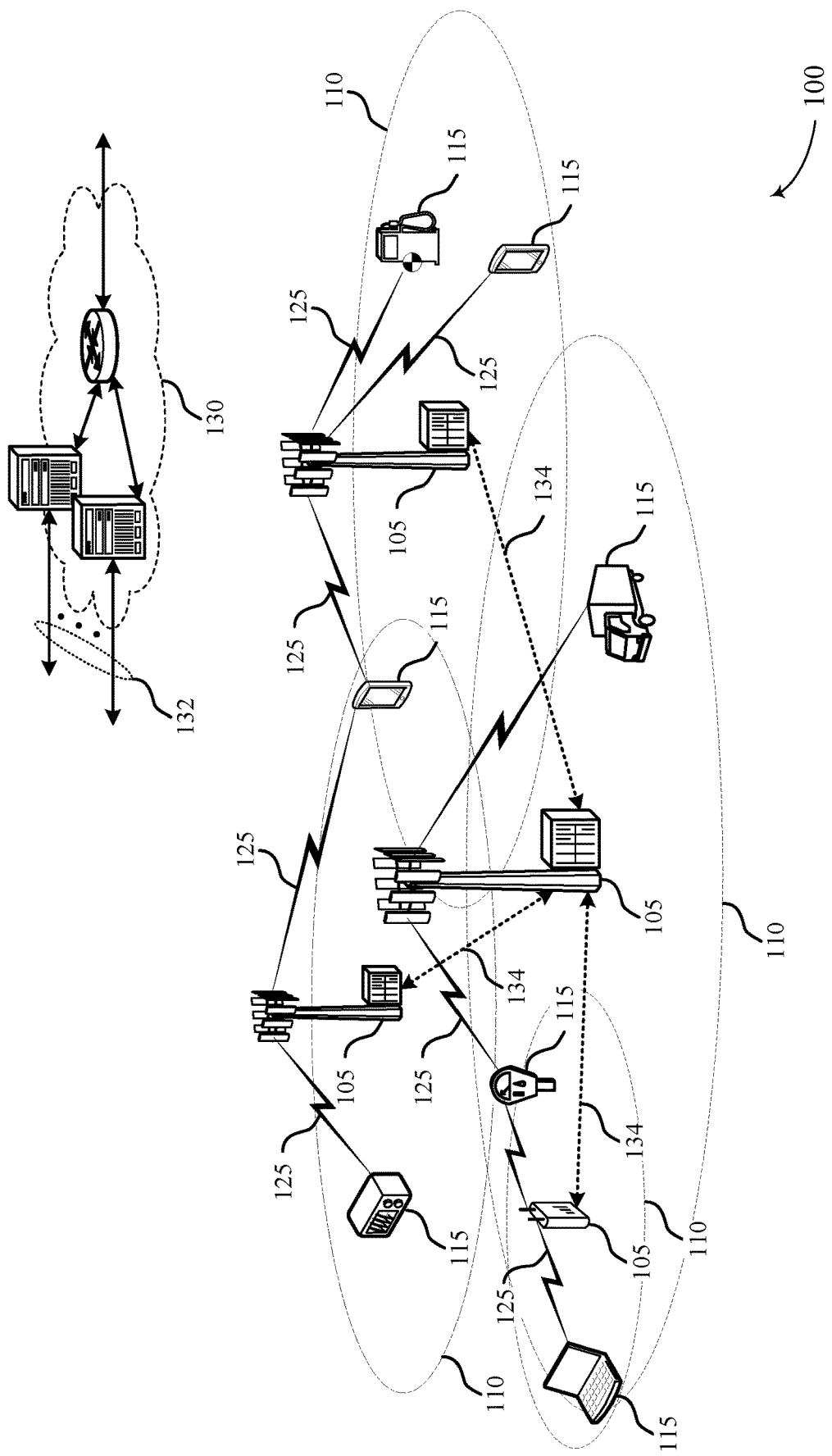
FIG. 1 illustrates an example of a wireless communications system that supports retuning for machine type communication (MTC) in accordance with various aspects of the present disclosure.

Some wireless systems support data communication technologies that allow devices to communicate with one another or a base station without human intervention. Such communication may be referred to as machine type communication (MTC). In some cases, systems may use techniques or features tailored for MTC devices, which may be referred to as enhanced MTC (eMTC). A MTC device or MTC UE may be a low complexity, low cost device—relative to other user equipment (UEs)—and may be characterized by features such as low power operation, limited duplexing capability, and operation in environments with poor radio link conditions. To support eMTC, systems may be configured to account for operating characteristics of MTC devices. In some cases, MTC UEs may use narrowband operation within a wider system bandwidth. For example, a MTC UE may use a bandwidth of 1.4, 3, 5, 10, 15, or 20 MHz.

In some wireless systems, the frequency of transmitted signals may be changed periodically. This frequency hopping may help achieve frequency diversity and may help avoid narrowband interference. In some cases, UEs may have a wideband operation capability and may receive the signal as the frequency is changed. Other devices, such as some MTC UEs, may not be configured for wideband operation. In this case, the device may need to retune each time the frequency changes. This retuning may take a finite period of time and may result in increased network overhead.

To avoid negative performance and to reduce the delay period during frequency retuning for narrowband operation, retuning periods may be reduced. Frequency retuning may occur in a period of less than a subframe, for example, on the order of a few symbol periods. Additionally, the frequency retuning may occur during the control region of a subframe. Some devices, such as MTC devices, may ignore information in the control region anyway, so using that time for retuning may mitigate issues. Thus, the device may retune in time to receive its transmission. In some cases, the base station and UE may support specific retuning configurations. In other cases, a base station may accommodate UEs with different retuning configurations and may infer the UE's configuration based on their communication. Multiple UEs connected within a wireless system may have different configurations. In some cases, the base station may switch between various configurations based on the coverage enhancement (CE) of the UE.

In general, the retuning configuration may differ for uplink (UL) and downlink (DL). For example, UL may use one subframe to retune, and DL may use a time period equivalent to a few symbol periods. In the case of UL, there may be no legacy control; thus, the retuning time may imply a decrease in spectral efficiency. In some cases, the retune configuration for UL may depend on the CE.

In some cases, a UE may rate-match based on its UL retune time period. In other examples, the UE may puncture uplink subframes or symbols to account for the retuning time. The base station may not know the retuning capabilities of the UE. In these cases, the base station may detect when the UE begins transmitting. In some cases, uplink demodulation reference signal (DMRS) may be sent in the first symbols of the first physical uplink shared channel (PUSCH) after retuning, instead of, or in addition to, for example, sending DMRS in other symbols within the subframe. DMRS may be easier for the base station to detect and may facilitate base station detection of uplink transmissions. Thus, if the base station detects the DMRS, it may be used for channel estimation. In other examples, a UE may send its retune configuration to the base station, and the base station may rate-match the UL based on the received configuration.

In some cases, a UE may use the same antenna ports for MTC physical downlink control channel (MPDCCH) and physical downlink shared channel (PDSCH). This may enable channel estimation bundling across the MPDCCH and PDSCH channels. In this case, data or DMRS may use the same precoders across MPDCCH and the associated PDSCH. In some cases, the UE may use legacy ports or may use a common port, for example, port 207/209. Additionally, the precoding matrix may be standardized such that cell-specific reference signals (CRS) and DMRS may be used for demodulation of both MPDCCH and PDSCH.

In some wireless systems, the control format indicator (CFI) may be indicated to the UE. The CFI may contain the number of control symbols. In some cases, the physical control format indicator channel (PCFICH) may not be decoded by a UE (e.g., due to narrowband front-end) and the CFI may be fixed across numerous subframes. But it may be advantageous for a base station to override the previous CFI configuration. For example, a base station may handle a large load of control information in a given subframe, but may not communicate this decision to the UE. In this case, the base station may change the PCFICH and transmit more control symbols. The base station may perform puncturing. For example, the MTC PDSCH may be punctured by legacy PDCCH. In such cases, the MTC UE may not be aware of the change in CFI and the UE may decode PDSCH assuming signaled CFI. Other UEs may rate-match to the new PDCCH region. For example, they may decode PCFICH and may then be aware of the change.

In some examples, frequency retuning for downlink communications may occur during symbol periods that contain reference signals, which may result in the UE not receiving the reference signals. As discussed below, reference signals may include CRS, which may be used for channel estimation, frequency tracking, or time tracking, or DMRS (or UE-specific reference signal (UERS)), which may be used for channel estimation, demodulation, or the like. A subframe may contain CRS in symbol periods 0, 4, 7, and 11, and may contain DMRS in symbols 5 and 6. In some cases, the UE may retune during time periods that include reference signals, such as CRS or DMRS. For example, a UE may retune during symbol period 0 and may not receive CRS tones contained in symbol period 0. In order to avoid situations in which a UE retunes to a different frequency during a symbol that includes a reference signal, some subframes may be designated as retuning subframes; UEs may thus determine a subframe is a retuning subframe and perform retuning operations (e.g., retune a transceiver) during a particular symbol period (or other portion) of the retuning subframe.

As discussed below, a UE may adjust its behavior slightly if retuning subframes are used. For example, a UE may change its frequency tracking, time tracking, or channel estimation behavior to leverage CRS or DMRS, or both, in symbols other than the symbol in which the retuning operation is performed. In such cases, the UE may still use CRS received in symbol periods 4, 7, and 11 for channel estimation, frequency tracking, or time tracking. It may also still use DMRS received in symbol periods 5 and 6 for channel estimation, for example. In some cases, demodulation may be based on CRS or DMRS alone in retuning subframes. This mode may be switched based on if the subframe is a retuning subframe or not. In some cases, only the retuning subframes may have DMRS and other subframes may have CRS.

Aspects of the disclosure introduced above are described in further detail below in the context of a wireless communication system. Specific examples are then described for retuning MTC devices. These and other aspects of the disclosure are further illustrated by and described with reference to apparatus diagrams, system diagrams, and flowcharts that relate to retuning for MTC.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a MTC device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Some types of wireless devices may provide for automated communication. Automated wireless devices may include those implementing Machine-to-Machine (M2M) communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. A MTC device may operate using half-duplex (one-way) communications at a reduced peak rate. MTC devices may also be configured to enter a power saving "deep sleep" mode when not engaging in active communications.

LTE systems may utilize orthogonal frequency division multiple access (OFDMA) on the DL and single carrier frequency division multiple access (SC-FDMA) on the UL. OFDMA and SC-FDMA may partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, or 16 sub-bands. Some MTC UEs may operate in a narrow bandwidth compared to the full system bandwidth.

Carriers may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Some DL subframes may designated (e.g., by a system operator) as retuning subframes, during which the UE may retune its transceiver. These retuning subframes may contain different patterns of reference signals than other subframes. For example, retuning subframes may not contain CRS in the initial symbol period of the subframe, while other subframes might have CRS in the initial symbol period. Special subframes may carry DL or UL traffic and may include a Guard Period (GP) between DL and UL traffic. Switching from UL to DL traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported. For example, TDD frames may include one or more special frames, and the period between special frames may determine the TDD DL-to-UL switch-point periodicity for the frame. Use of TDD offers flexible deployments without requiring paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115. Some MTC UEs may be configured for half-duplex operation.

Data may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and uplink shared channel (UL-SCH) for data. DL physical channels may include physical broadcast channel (PBCH) for broadcast information, PCFICH for control format information, physical downlink control channel (PDCCH) for control and scheduling information, physical hybrid automatic repeat request (HARQ) indicator channel (PHICH) for HARQ status messages, PDSCH for user data and physical multicast channel (PMCH) for multicast data. UL physical channels may include physical random access channel (PRACH) for access messages, physical uplink control channel (PUCCH) for control data, and PUSCH for user data.

PDCCH carries downlink control information (DCI) in control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple input multiple output (MIMO), the DCI may include additional signaling information. DCI size and format may depend on the amount of information as well as factors such as bandwidth, the number of antenna ports, and the duplexing mode. Some wireless systems may use MPDCCH for control and scheduling information for MTC UEs. In some cases, the UE may use the same antenna ports for MPDCCH and PDSCH to enable channel estimation bundling across these channels. In some cases, legacy port or a new common port may be used.

A base station 105 may insert periodic pilot symbols such as CRS to aid UEs 115 in channel estimation and coherent demodulation. CRS may include one of 504 different cell identities. They may be modulated using quadrature phase shift keying (QPSK) and may be power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, DMRS may be directed toward specific UEs 115 and may be transmitted only on resource blocks assigned to those UEs 115. DMRS may include signals on 6 resource elements in each resource block in which they are transmitted. The DMRS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, retuning subframes may contain different patterns of reference signals than other subframes to account for a UE's retuning during the subframe. Additional reference signals known as channel state information reference signals (CSI-RS) may be included to aid in generating channel state information (CSI). On the UL, a UE 115 may transmit a combination of periodic sounding reference signal (SRS) and UL DMRS for link adaptation and demodulation, respectively. In some cases, DMRS may be contained at the beginning of a subframe and may be used by a base station for channel estimation.

A frame structure may be used to organize physical resources. A frame may be a 10 ms interval that may be further divided into 10 equally sized subframes. Each subframe may include two consecutive time slots. Each slot may include 6 or 7 OFDMA symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a CRS and a UERS. UERS may be transmitted on the resource blocks associated with PDSCH. The number of bits carried by each resource element may depend on the modulation scheme (the configuration of symbols that may be selected during each symbol period). Thus, the more resource blocks that a UE receives and the higher the modulation scheme, the higher the data rate may be. In some cases, including in designated retuning subframes, one or more symbol periods may be designated as retuning subframes, and the UE may retune (i.e., tune a transceiver) between frequency bands during a symbol period of a subframe.

Time intervals in Long Term Evolution (LTE) may be expressed in multiples of a basic time unit (e.g., the sampling period, $T_s=1/30,720,000$ seconds). Time resources may be organized according to radio frames of length of 10 ms ($T_f=307200 \cdot T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

In some cases, wireless communication system 100 may utilize CE techniques to improve the quality of a communication link 125 for UEs 115 located at a cell edge, operating with low power transceivers, and/or experiencing high interference or path loss. CE techniques may include repeated transmissions, TTI bundling, HARQ retransmission, PUSCH hopping, beamforming, power boosting, or other techniques. The CE techniques used may depend on the specific needs of UEs 115 in different circumstances. For example, TTI bundling may involve sending multiple copies of the same information in a group of consecutive TTIs rather than waiting for a negative acknowledgement (NACK) before retransmitting redundancy versions. This may be effective for users engaging in voice over Long Term evolution (VoLTE) or voice over internet protocol (VOIP) communications. In other cases, the number of HARQ retransmissions may also be increased. Uplink data transmissions may be transmitted using frequency hopping to achieve frequency diversity. Beamforming may be used to increase the strength of a signal in a particular direction, or the transmission power may simply be increased. In some cases, one or more CE options may be combined and CE levels may be defined based on a number of decibels the techniques are expected to improve a signal (e.g., no CE, 5 dB CE, 10 dB CE, 15 dB CE, etc.). In some cases, the frequency retuning configuration may depend on the CE configuration for a UE.

According to the present disclosure, MTC UEs 115 or base stations 105, or both, may account for short duration retuning to support frequency hopping and enhanced MTC operation. A base station may refrain from transmitting to account for retuning delays. Likewise, a base station 105 may receive uplink communications by accounting for retuning delays.

Figure 2:
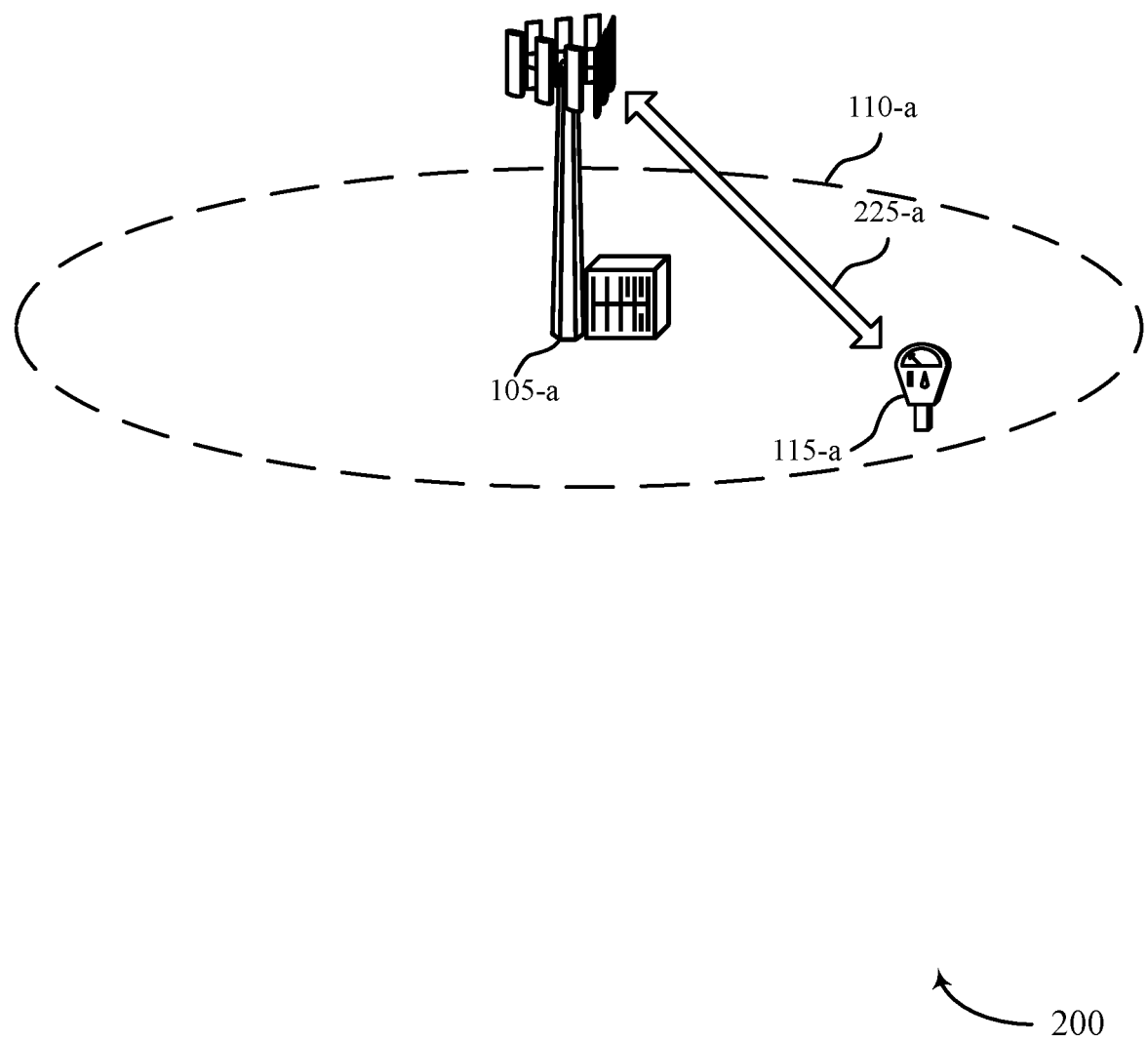
FIG. 2 illustrates an example of a wireless communications system that supports retuning for MTC in accordance with various aspects of the present disclosure.

FIG. 2 illustrates an example of a wireless communications system 200 for MTC frequency retuning in accordance with various aspects of the present disclosure. Wireless communications system 200 may include a UE 115-*a* and base station 105-*a*, which may be examples of a UE 115 base station 105 described with reference to FIG. 1. In some cases, UE 115-*a* is a MTC device, and may operate with a narrowband configuration and may retune its frequency to accommodate frequency hopping.

Some wireless systems support data communication technologies that allow devices to communicate with one another or a base station without human intervention. Such communication may be referred to as MTC. In some cases, systems may support MTC by using techniques or features tailored for MTC devices. Techniques or features used for improving MTC may be referred to as eMTC. To support eMTC, systems may be configured to account for operating characteristics of MTC devices, which may be different from other UEs. This may include broadcasting certain MTC-specific system information using various repetition levels, transport block sizes, and the like.

UE 115-a may be a MTC device or MTC UE, which may be a low complexity, low cost device—relative to other UEs—and may be characterized by features such as low power operation, limited duplexing capability, and/or operation in environments with poor radio link conditions. To help overcome poor radio link conditions, wireless communications system 200 may implement techniques for CE. CE may be achieved through increased power of data and reference signals, transmission repetition, retransmission, or relaxed performance requirements. For example, communication link 225-a may employ CE. Wireless communications system 200 may be configured with these MTC UE characteristics in mind. In particular, wireless communications system 200 may support eMTC by supporting narrowband operation within a larger system bandwidth.

UE 115-a may monitor DL control channels, such as the physical downlink control channel (PDCCH) or the enhanced physical downlink control channel (EPDCCH), in a wideband operation mode. UE 115-a may also use narrowband operation within a wider system bandwidth. For example, UE 115-a may use a bandwidth of 1.4, 3, 5, 10, 15, or 20 MHz.

In wireless communications system 200, frequency hopping may be used to avoid narrowband interference and improve communication. This technique may change the frequency channel while transmitting signals. In some cases, UE 115-a may have a wideband operation capability and may receive the signal as the frequency is changed. In other cases, UE 115-a may not be configured for wideband operation. In this case, UE 115-a may need to retune each time the frequency changes. This retuning may take a finite period of time and may result in increased network overhead.

As mentioned above, to reduce the delay period during frequency retuning for narrowband operation, frequency retuning may be performed concurrently with other operations or in a manner that accounts for other operations. Frequency retuning may occur in a period of less than a subframe, for example, on the order of a few symbol periods. Additionally, the frequency retuning may occur during the subframe time period in which control information is transmitted. In this region, UE 115-a may ignore this information. Thus, the device may retune in time to receive its transmission. In some cases, base station 105-a and UE 115-a may be configured for a specific retuning configuration. In other cases, base station 105-a may accommodate UE 115-a with different retuning configurations and may infer its configuration based on its communication. Multiple UEs connected within a wireless system (e.g., wireless communications system 100) may have different configurations. In some cases, base station 105-a may switch between various configurations based on the CE of UE 115-a.

In general, the retuning configuration may differ for UL and DL. For example, UL may use one subframe to retune, and DL may use a time period equivalent to a few symbol periods. In the case of UL, there may be no legacy control; thus, the retuning time may imply a decrease in spectral efficiency. In some cases, the retune configuration for UL may depend on the CE.

In some examples, UE 115-a may rate-match based on its UL retune time period. In another case, UE 115-a may puncture some symbols. Base station 105-a may not know the retuning capabilities of UE 115-a. In this case, base station 105-a may detect when UE 115-a begins transmitting. In some cases, DMRS may be sent in the first symbols of the first PUSCH after retuning, instead of, for example, sending DMRS in other symbols within the subframe. In some cases, DMRS may be easier for base station 105-a to detect. Thus, if base station 105-a detects the DMRS, it may use it for channel estimation. In another case, UE 115-a may send its retune configuration to base station 105-a, and base station 105-a may rate-match the UL based on the received configuration.

In some cases, UE 115-a may use the same antenna ports for MPDCCH and PDSCH. This may enable channel estimation bundling across the MPDCCH and PDSCH channels. In this case, data or DMRS may use the same precoders across MPDCCH and the associated PDSCH. In some cases, UE 115-a may use legacy ports or may use a common port, for example, port 207/209. Additionally, the precoding matrix may be standardized such that CRS and DMRS may be used for demodulation of both MPDCCH and PDSCH.

In wireless system 200, the CFI may be indicated to UE 115-a. The CFI may contain the number of control symbols. In some cases, the PCFICH may not be decoded and the CFI may be fixed across numerous subframes. However, it may be advantageous for base station 105-a to override the previous CFI configuration. For example, base station 105-a may handle a large load of control information in a given subframe, but may not communicate this decision to UE 115-a. In this case, base station 105-a may change the PCFICH and transmit more control symbols. Base station 105-a may perform puncturing. For example, the MTC PDSCH may be punctured by legacy PDCCH. In such cases, UE 115-a may not be aware of the change in CFI and UE 115-a may decode PDSCH assuming signaled CFI. In some cases, UE 115-a may rate-match to the new PDCCH region. For example, it may decode PCFICH and may then be aware of the change.

In some cases, frequency retuning for downlink communications may occur during symbol periods that contain reference signals, which may result in UE 115-a not receiving the reference signals from base station 105-a transmitted during the retuning time. To avoid these issues, some DL subframes may be designated as retuning subframes and may include a symbol period designated for, or that accommodates the time for a UE to retune from one frequency band to another.

Figure 3A:
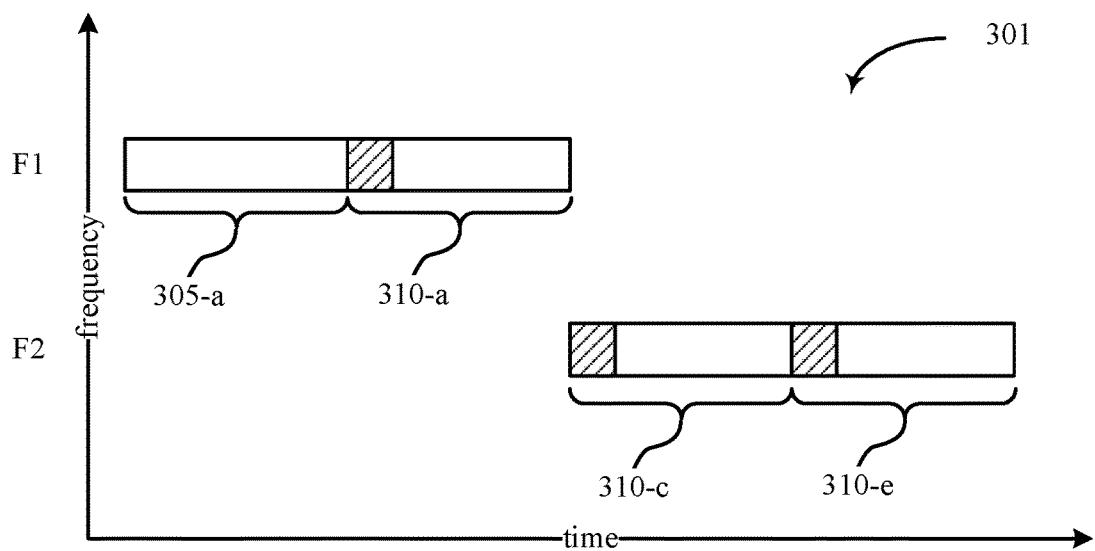
FIG. 3A-3E illustrates an example of a frequency hopping process that supports retuning for MTC in accordance with various aspects of the present disclosure.
Figure 3A:
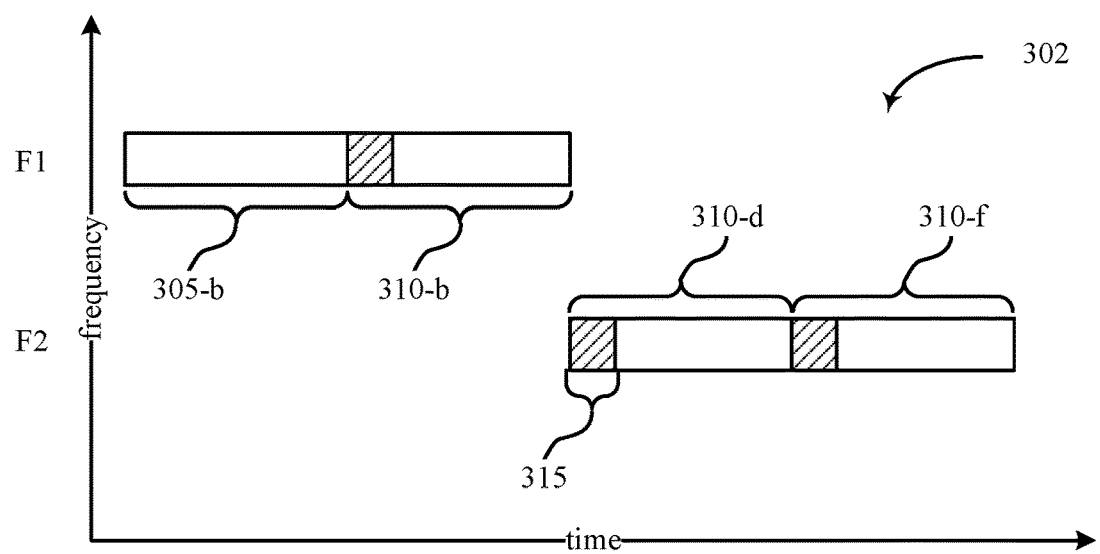
Figure 3A:
Figure 3B:
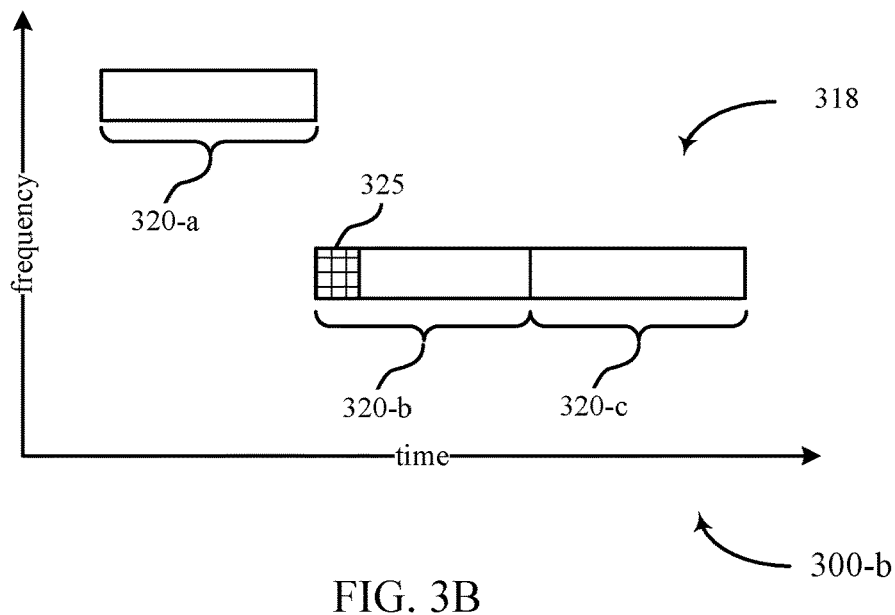
Figure 3C:
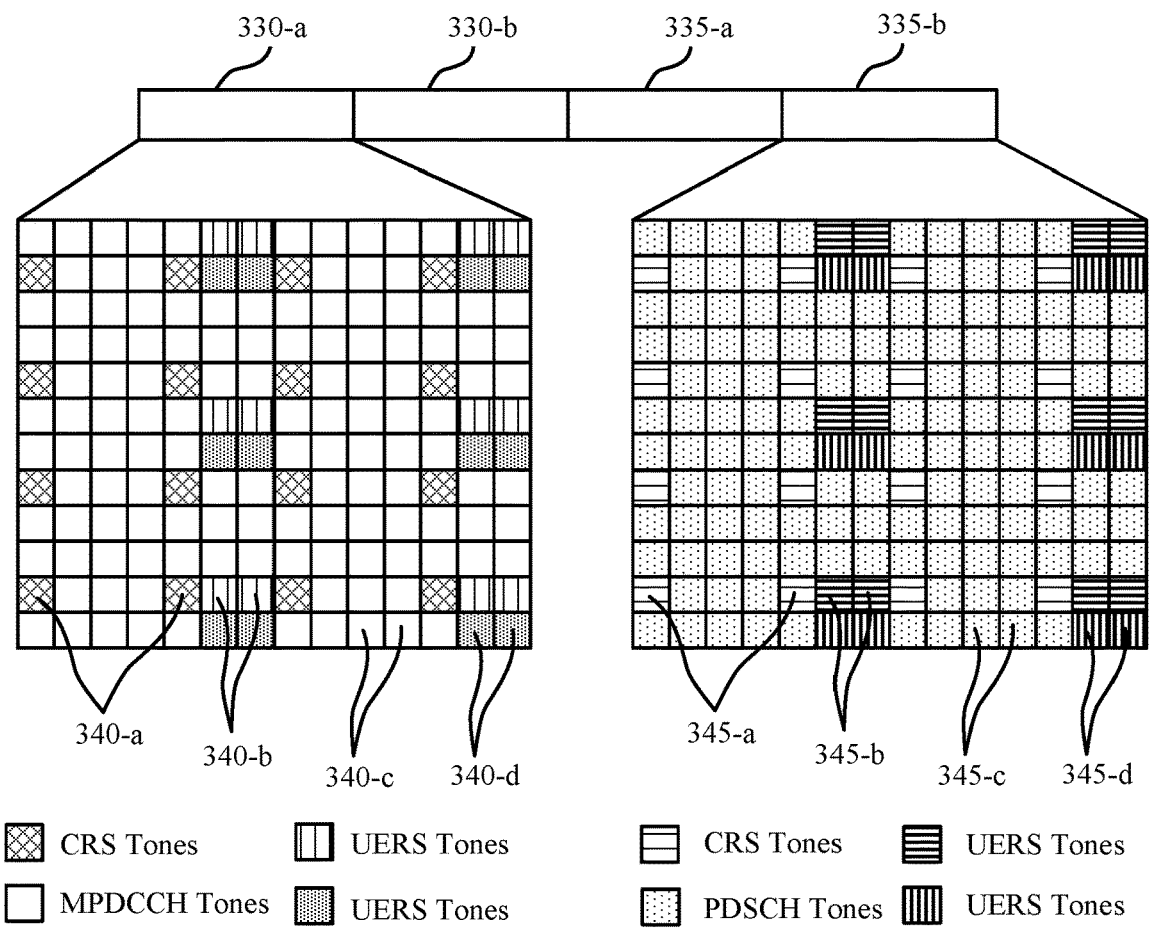

FIGS. 3A-3C illustrate examples of a frequency hopping configurations 300-a, 300-b, and 300-c for MTC frequency retuning in accordance with various aspects of the present disclosure. Frequency hopping configurations 300-a, 300-b, and 300-c may illustrate techniques for MTC frequency retuning to enable frequency hopping of UL and DL transmissions.

Frequency hopping configuration 300-a in FIG. 3A may represent a downlink situation with frequency hopping. Plot 301 may represent the transmission from a base station 105. Plot 302 may represent a UE 115 receiving the transmission.

Time periods 305-*a* and 305-*b* may represent a TTI that contains MPDCCH. Time periods 310-*a* through 310-*f* may represent TTIs that contain PDSCH. The TTI may contain N symbols of control information that may be sent at the beginning of the TTI. Initially, the transmission has a frequency of F1, where time periods 305-*a,b* and 310-*a,b* are transmissions at frequency F1. After time period 310-*a*, a base station may change the transmission frequency to F2. After time period 310-*b*, a UE may retune its frequency to F2. This frequency retuning may take a finite period of time for the UE; thus, the UE may begin monitoring frequency F2 at time 315. Time 315 may not, in general, coincide with the beginning of time period 310-*c,d*. In some cases, Time 315 may occur in the region of a TTI that contains control symbols. In other cases, Time 315 may occur after the PDSCH control symbols are transmitted.

In one example, a base station 105 may configure its operation based on the worst retuning capability of all UEs 115 that it services. For example, the number of control symbols in a frame, N, may be known by a UE 115. The UE 115 may have a retuning capability of M symbols, i.e., the UE 115 can retune within a time period equivalent to the length of M symbols. However, other UEs 115 in the wireless network may have a retuning capability of K symbols, where K>M. In this case, the base station 105 may assume that K symbols are lost due to frequency retuning by the UEs. This may be equivalent to performing rate-matching for K control symbols in first subframe after retuning and then N control symbols from that point on.

In some examples, the base station 105 may not perform any rate-matching to accommodate retuning delays of the UEs 115. In this case, if the retuning time period for the UE is less than the control symbol time period, i.e., M≤N, then the UE may retune sufficiently fast and receive all data symbols. In this case, Time 315 in FIG. 3A would begin in the shaded control information region of the PDSCH time period 310-*d*. If M>N, then the UE may not retune fast enough to receive all data symbols, i.e., time period 315 may begin after the shaded control information region of the PDSCH time period 310-*d*. In this case, the UE may decode the received symbols as if they were punctured.

In other examples, the base station may know the UE retuning speed. For example, the UE may signal its configuration to the base station. The base station may then rate-match to the UE retuning speed. For example, if a UE retunes in a time period of M symbols, then the base station may rate-match for M symbols.

In some cases, the base station may switch between various configurations based on the CE of the UE. For example, if the bundle size is large (e.g., eight subframes in each hop), the loss due to puncturing may be small and puncturing by the UE may not come at a large cost. If the bundle size is small, (e.g., for a UE with small CE), puncturing may result in coding loss. In these cases, the base station may determine to use a retuning configuration that may mitigate puncturing by the UE.

In some cases, the CFI may be indicated to the UE. The CFI may contain the number of control symbols. In some cases, the PCFICH may not be decoded and the CFI may be fixed across numerous subframes. It may be advantageous for a base station to override the previous CFI configuration. For example, a base station may handle a large load of control information in a given subframe, but may not communicate this decision to the UE. In this case, the base station may change the PCFICH and transmit more control symbols. The base station may perform puncturing. For example, the MTC PDSCH may be punctured by legacy PDCCH. In such cases, the MTC UE may not be aware of the change in CFI and the UE may decode PDSCH assuming signaled CFI. Other UEs may rate-match to the new PDCCH region. For example, they may decode PCFICH and may then be aware of the change.

Frequency hopping configuration 300-*b* in FIG. 3B may represent an uplink situation with frequency hopping. Plot 318 may represent an uplink from a UE 115 to a base station 105 using frequency hopping. Time periods 320-*a* through 320-*c* may represent PUSCH TTIs. At time period 320-*a*, the UE may transmit at one frequency and may change frequencies before transmitting at time period 320-*b*. Time period 325 may represent the time it takes for the UE to retune when changing transmission frequencies. In the case of UL, there is no legacy control; thus, the retuning time may imply a decrease in spectral efficiency. In general, this UL retuning time period may be different than the DL retuning time period. For example, UL may use one subframe to retune, and DL may use a time period equivalent to a few symbol periods. In general, the retune configuration for UL may depend on the CE.

In one example, the UE may rate-match based on its UL retune time period. For example, if the UE retunes in a time period of L symbols, i.e., in this case, time period 325 in FIG. 3B would be equal to the length of L symbols. In this case, the UE may rate-match to L symbols.

In a second example, the UE may puncture some symbols. For example, the UE may retune in a time period of L symbols, but it may puncture P symbols. In some cases, the base station may not know the retuning capabilities of the UE. If so, the base station may detect when the UE begins transmitting. In some cases, the first L symbols of the first PUSCH after the frequency change (time period 320-*b*) may be used for DMRS, instead of, for example, contained in other symbols within the subframe. DMRS may be easier for the base station to detect. Thus, if the base station detects the DMRS, it may use it for channel estimation.

In a third example, a UE may signal its retuning configuration to the base station, and the base station may rate-match the UL based on the received configuration. That is, the base station may take into account the retuning time of time period 325.

FIG. 3C represents a configuration 300-*c* for channel estimation bundling. Time periods 330-*a,b* may represent MPDCCH TTIs. Time periods 335-*a,b* may represent PDSCH TTIs. MPDCCH may consist of symbols with units of time and frequency. Symbols 340-*a* may represent CRS tones within MPDCCH. Symbols 340-*c* may represent MPDCCH tones. Symbols 340-*b* may represent UERS tones within MPDCCH and may use ports 207 and 208. Symbols 340-*d* may represent UERS tones within MPDCCH that use ports 209 and 210. Symbols 345-*a* may represent CRS tones within PDSCH. Symbols 345-*c* may represent PDSCH tones. Symbols 345-*b* may represent UERS tones within PDSCH and may use ports 207 and 208. Symbols 345-*d* may represent UERS tones within PDSCH that use ports 209 and 210.

In some cases, a UE may use the same antenna ports for MPDCCH and PDSCH. This may enable channel estimation bundling across the MPDCCH and PDSCH channels. In this case, data or DMRS may use the same precoders across MPDCCH and the associated PDSCH. In some cases, the UE may use legacy ports or may use a common port, for example, port 207 and 209. Additionally, the precoding matrix may be standardized such that CRS and DMRS may be used for demodulation of both MPDCCH and PDSCH.

In some examples, a legacy PUCCH structure (e.g., LTE Rel. 8 PUCCH structure) may have a shortened configuration due to the presence of a sounding reference signal (SRS). MTC operation may introduce errors in these cases because the lost symbols due to retuning of the MTC device may affect the orthogonality with PUCCH of legacy users. For example, the delay associated with retuning for frequency hopping may affect the orthogonality of transmissions from the respective UEs. In order to accommodate this, MTC UE uplink operation may be shifted so that a retuning time (e.g., a symbol) aligns with an SRS resource, and the remaining PUCCH symbols maintain the orthogonality properties.

Figure 3D:
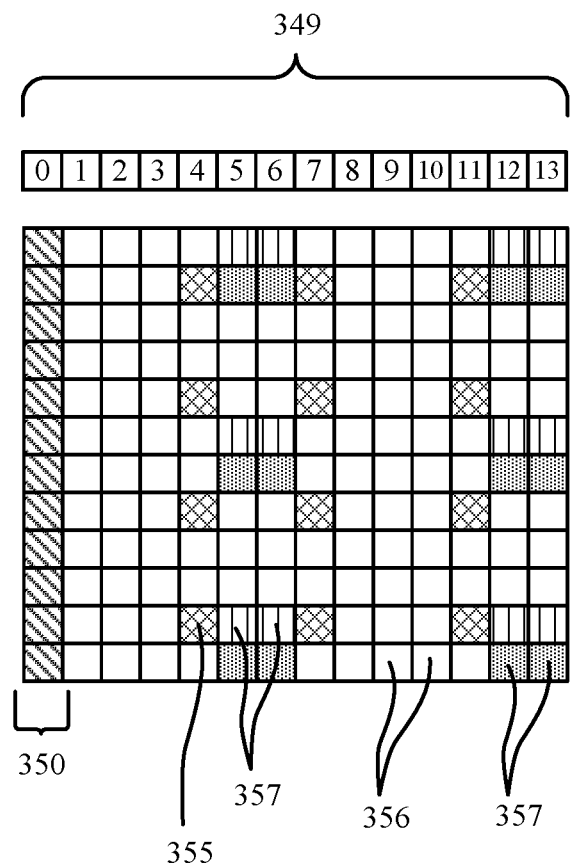

FIG. 3D illustrates a retuning subframe configuration 300-*d* that supports retuning for MTC in accordance with various aspects of the present disclosure. The subframe configuration 300-*d* may use LTE/LTE-A numerology; and, in the example of FIG. 3D, the configuration 300-*d* includes 14 symbol periods 349. Symbol period 350 (i.e., the initial symbol period of the subframe configuration 300-*d*) may represent a symbol time period used for frequency retuning. The retuning subframe configuration 300-*d* may also include CRS 355, MPDCCH or MPDSCH tones 356, and UERS 357 (UERS 357 may also be referred to as DMRS). Some UERS 357 may be transmitted on antenna ports 207 and 208, for instance, and others may be transmitted on antenna ports 209 and 210.

A UE may retune from one frequency band to another, as discussed herein, and the retuning may have duration of about a symbol period. So A UE 115 may not receive signals transmitted during symbol periods in which the retuning occurs. In some cases, CRS 355 may be transmitted in symbol periods 0, 4, 7, and 11. In the example of FIG. 3D, CRS 355 may not be transmitted during symbol period 350—a designated retuning time—and CRS 355 or DMRS, or both, may be transmitted during other symbol periods. In the example of FIG. 3D, the UE may perform frequency tracking, channel estimation, or demodulation based on the available CRS 355 or UERS 357. The UE may, for example, use CRS received in symbol periods 4, 7, and 11 for channel estimation, frequency tracking, or time tracking. The UE may, in some cases, use UERS 357 received in symbol periods 5 and 6 for channel estimation. In various examples, demodulation may be based on CRS 355 or UERS 357. Whether CRS or UERS demodulation is employed may be a function of whether a particular subframe is a retuning subframe or not. By way of example, UERS 357 may be limited to retuning subframes and thus demodulation in retuning subframes may rely on UERS 357.

A UE may receive signaling that indicates that a particular TTI or group of TTIs is designated for tuning between frequency bands (e.g., has a configuration 300-*d*). In some cases, designated retuning TTIs may be signaled in system information.

As discussed herein, during some frequency hopping operations, symbols may not be transmitted or received in order to account for retuning time of, e.g., a MTC device. But in some cases, retuning may align or be configured to align with timing boundaries employed within a system.

For example, retuning may be associated with a TTI bundling operation such that retuning may occur during a TTI (e.g., a subframe) that is otherwise not designated for transmission. This type of TTI may be referred to as an invalid subframe. In some cases, including TDD configurations, frequency hopping may occur at times and/or to frequency regions designated for transmission in a particular direction. For instance, frequency hopping may be between frequency regions designated for uplink or downlink transmission, and frequency hopping between uplink regions, for instance, may occur during downlink designated subframes. In some cases, if retuning is expected, a UE may not retune because a measurement gap is expected.

So in some examples, a transmitter and receiver (e.g., a base station and a UE) may retune so that rate-matching or puncturing is unnecessary. In such cases, rate-matching or puncturing, or both, may be done to accommodate source and destination narrowband frequency regions, accounting for subframes in which transmission or reception may not occur while hopping between regions. If a time period (e.g., a TTI, such as a subframe) between regions is not necessarily scheduled for transmission, the UE may not rate-match to receive messages in the different regions. In such cases, the UE may be able to avoid rate-matching and puncturing as discussed herein with respect to other examples.

For instance, as discussed herein, retuning may be performed by dropping the last symbol of a first subframe of a source frequency region and the first symbol of a second subframe of a destination frequency region, or it may include dropping the last two symbols of a subframe before retuning. The timing for retuning may, however, be such that symbols need not be dropped.

Figure 3E:
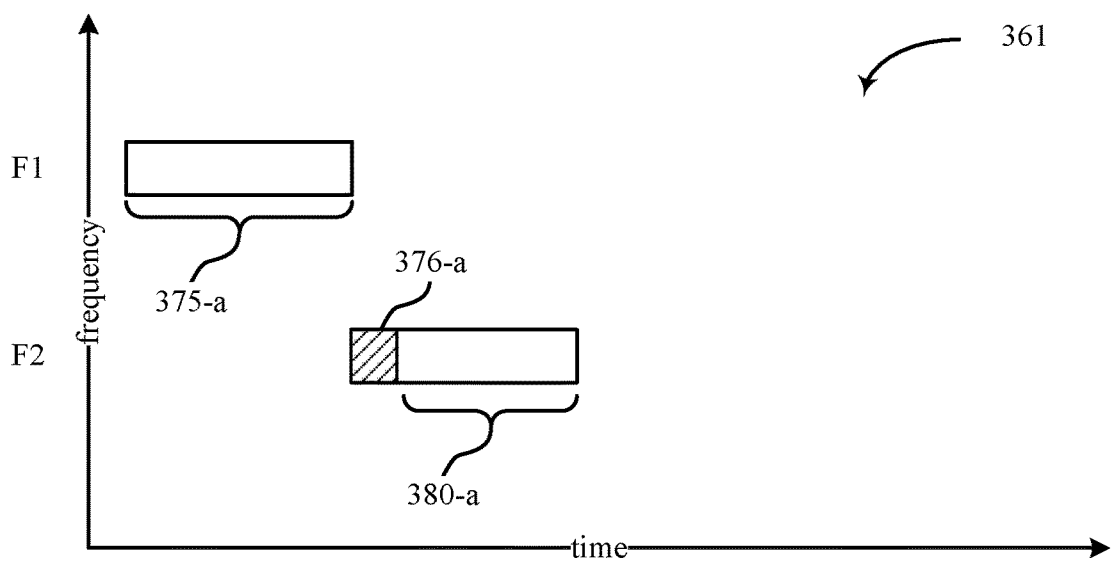
Figure 3E:
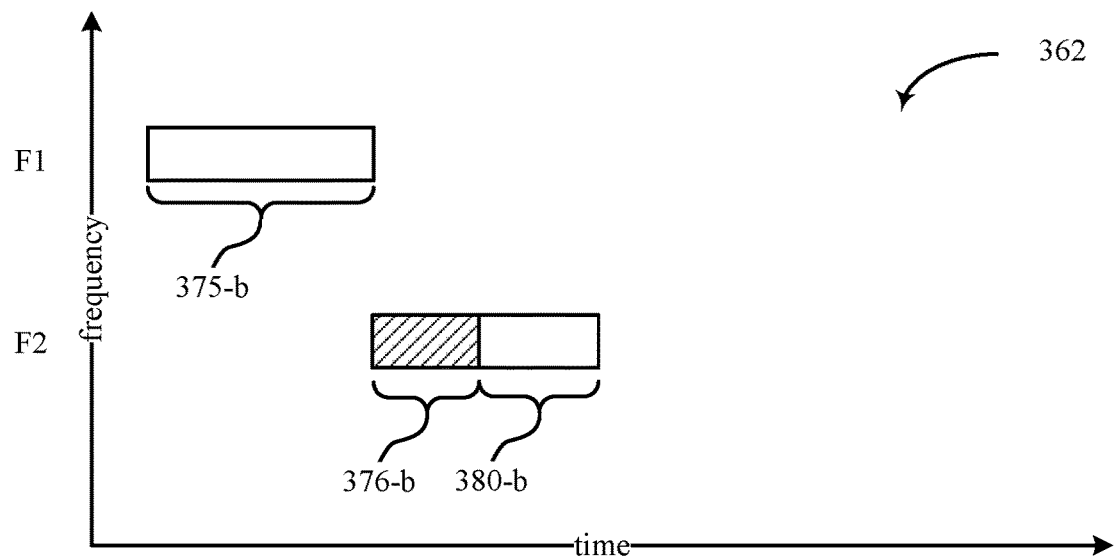

FIG. 3E illustrates examples of frequency hopping configurations 300-*e* for MTC frequency retuning in accordance with various aspects of the present disclosure. Frequency hopping configurations 300-*e* may illustrate techniques for MTC frequency retuning to enable frequency hopping of UL and DL transmissions.

In the example depicted in plot 361, a UE and base station may account for a TTI during which transmissions may otherwise be unscheduled or not anticipated in order to avoid rate-matching or puncturing. For instance, during a TTI within time period 375-*a*, a first message may be transmitted or received in a first frequency band. A transmitter and receiver may both retune to another frequency band to transmit or receive a message in another TTI during time period 380-*a*. The retuning may occur during time period 376-*a*, which may be a TTI (e.g., an invalid subframe).

In the example depicted in plot 362, a UE and base station may account for a TTI during which transmissions may otherwise be unscheduled or not anticipated in order to avoid rate-matching or puncturing. For instance, during a TTI within time period 375-*b*, a first message may be transmitted or received in a first frequency band. A transmitter and receiver may both retune to another frequency band to transmit or receive a message in another TTI during time period 380-*b*. The retuning may occur during time period 376-*b*, which may be one or several TTIs. For example, time period 376-*b* may be a measurement gap or may include invalid subframes. In some cases, time periods 375-*b* and 380-*b* include TTIs configured for transmission in one direction and time period 376-*b* includes one or several TTIs configured for transmission in another, different direction. For instance, time periods 375-*b* and 380-*b* may include uplink TTIs and time period 376-*b* may include one or several downlink TTIs, or vice versa.

In some cases, a base station may choose a valid subframe configuration such that retuning occurs in a subframe (e.g., retuning aligns with the invalid subframes or other designated retuning subframes). This type of operation may avoid losing resources and may maintain orthogonality between UEs (e.g., for PUCCH transmissions, such as HARQ feedback).

Figure 4A:
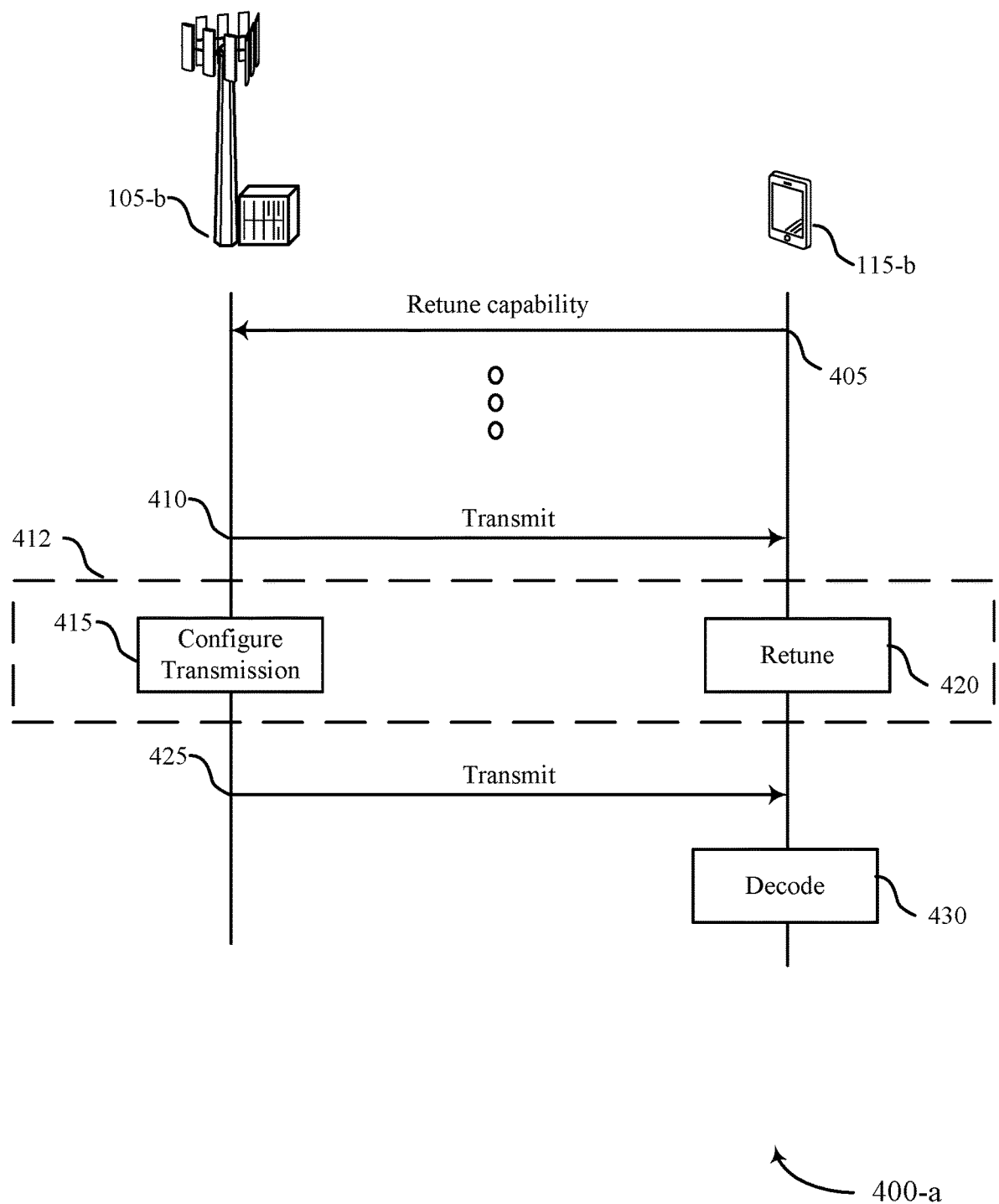
FIG. 4A-4B illustrates an example of a process flow that supports retuning for enhanced MTC (eMTC) in accordance with various aspects of the present disclosure.
Figure 4B:
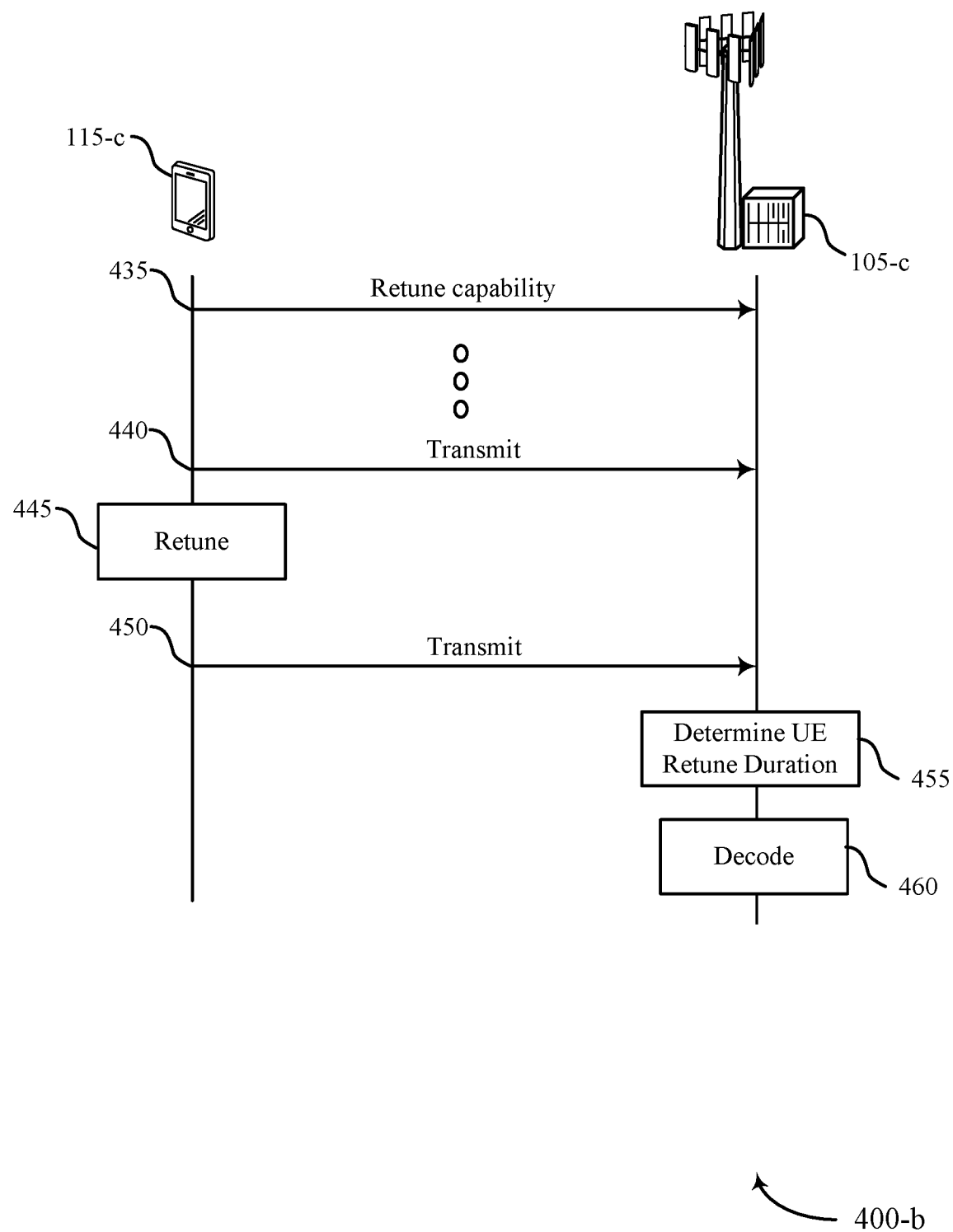

FIGS. 4A and 4B illustrate examples of process flow 400-*a* and process flow 400-*b* for MTC frequency retuning in accordance with various aspects of the present disclosure. Process flows 400-*a,b* may include a UEs 115-*b,c* and base stations 105-*b,c*, which may be examples of a UE 115 and base station 105 described with reference to FIGS. 1-2. In some cases, UEs 115-*b,c* may be MTC devices.

Process flow 400-*a* may represent aspects of downlink MTC retuning for frequency hopping. The base station 105-*b* may change the frequency of its transmissions, and UE 115-*b* may retune its frequency. This retuning may take a finite period of time.

At 405, base station 105-*b* may receive signaling from the UE indicative of a retuning capability. In some cases, base station 105-*b* may transmit signaling indicative of a control channel format to UE 115-*b*.

At 410, base station 105-*b* may transmit a first downlink message to UE 115-*b* during a first TTI in a first frequency band of a system bandwidth. In some cases, base station 105-*b* may transmit a downlink control channel during a first TTI, the downlink control channel may include a DMRS pattern and may be transmitted using a precoder.

At 412, the transmission frequency may change, at which point base station 105-*b* may configure its transmission at 415 and UE 115-*b* may retune at 420.

At 415, base station 105-*b* may determine a duration of the first portion of the second TTI based on a specified retuning time among UEs. In other cases, base station 105-*b* may determine that a duration of the first portion of the second TTI includes a control region of the second TTI. In some cases, base station 105-*b* may determine that a duration of the first portion of the second TTI includes a control region of the second TTI. In some examples, base station 105-*b* may determine that a duration of the first portion of the second TTI includes a control region of the second TTI. Base station 105-*b* may also determine a duration of the first portion of the second TTI based on the retuning capability. In some cases, base station 105-*b* may identify a CE requirement for UE 115-*b*, and base station 105-*b* may determine a duration of the first portion of the second TTI based on the CE requirement. In some cases, base station 105-*b* may determine that a control signal exceeds the control channel format. In some cases, base station 105-*b* may determine that a TTI is designated for tuning from a first frequency band of a system bandwidth to a second frequency band of the system bandwidth and reference signals may be transmitted in symbols of the TTI other than the initial symbol period of the TTI.

At 420, UE 115-*b* may retune a receiver to a second frequency band of the system bandwidth during a first portion of the second TTI. In some cases, UE 115-*b* may determine that a TTI is designated for tuning from a first frequency band of a system bandwidth to a second frequency band of the system bandwidth, and may tune from the first frequency band to the second frequency band during an initial symbol period of the TTI.

At 425, base station 105-*b* may transmit a second downlink message to UE 115-*b* during a second portion of the second TTI in a second frequency band. In some examples, the first portion of the second TTI comprises a control region and part of a data region of the second TTI. In some cases, base station 105-*b* may refrain from transmitting to the UE during a first portion of the second TTI to account for retuning by the UE. In other cases, base station 105-*b* may transmit a second downlink message that includes rate-matching around the first portion of the second TTI. In some cases, base station 105-*b* may transmit a downlink data channel during a second TTI, such that the downlink data channel may be transmitted using the precoder. In other cases, base station 105-*b* may transmit a data signal to UE 115-*b*, such that the data signal may be punctured by a portion of the control signal. In some examples, transmitting the data signal may include transmitting a power-boosted data signal.

At 430 UE 115-*b* may decode the second downlink message. In some cases, UE 115-*b* may decode based on an assumption that the second downlink message may be punctured by symbols including other data.

At 405, UE 115-*b* may transmit signaling indicative of a retuning capability.

At 410, UE 115-*b* may receive a first downlink message during a first TTI in a first frequency band of a system bandwidth. UE 115-*b* may receive a downlink control channel during a first TTI, the downlink control channel including a DMRS pattern.

At 425, UE 115-*b* may receive a second downlink message during a second portion of the second TTI in the second frequency band. In some examples the first portion of the second TTI comprises a control region and part of a data region of the second TTI. In some cases, UE 115-*b* may determine that the first portion of the second TTI includes part of the second downlink message. In some examples, the second downlink message is rate-matched around the first downlink message. In some cases, UE 115-*b* may receive a downlink data channel during a second TTI.

At 430, UE 115-*b* may demodulate data of the downlink data channel using at least the DMRS pattern of the downlink control channel. In some cases, UE 115-*b* may determine a precoding matrix for the downlink channel, such that the data may be demodulated using at least a CRS pattern of the downlink control channel and the CRS pattern of a downlink data channel.

Process flow 400-*b* may represent aspects of uplink MTC retuning for frequency hopping. The base station 105-*c* may change the frequency of its transmissions, and UE 115-*c* may retune its frequency. This retuning may take a finite period of time.

At 435, UE 115-*c* may transmit signaling indicative of a retuning capability, such that a duration of the first portion of the second TTI may be based on the retuning capability.

At 440, UE 115-*c* may transmit a first uplink message during a TTI in a first frequency band of a system bandwidth.

At 445, UE 115-*c* may retune a transmitter to a second frequency band of the system bandwidth during a first portion of a second TTI.

At 450, UE 115-*c* may transmit a second uplink message during a second portion of the second TTI in the second frequency band. In some examples, a duration of the first portion of the second TTI is based at least in part on a longest retuning time among UEs operating with the system bandwidth or a specified retuning time among UEs, or on a specified retuning time among UEs. In some cases, UE 115-*c* transmitting the second uplink message may include rate-matching around the first portion of a second TTI. In some examples, a duration of the first portion of the second TTI is based at least in part on a retuning capability of the transmitter. In some examples, the second portion of the second TTI is punctured by the first portion of the second TTI. In some cases, UE 115-*c* may transmit a DMRS in a third portion of the second TTI, where the third portion follows the first portion and precedes the second portion of the second TTI. In some cases, UE 115-*c* may identify a CE requirement, and UE 115-*c* may determine a duration of the first portion of the second TTI based on the CE requirement.

At 435, base station 105-*c* may receive signaling from the UE, the signaling may be indicative of the duration for the UE to retune.

At 440, base station 105-*c* may receive a first uplink message from UE 115-*c* during a first TTI in a first frequency band of a system bandwidth.

At 450, base station 105-*c* may receive a second uplink message from UE 115-*c* during a second TTI in a second frequency band of the system bandwidth. In some cases, base station 105-*c* may monitor for the second uplink message during a first portion of the second TTI. In some examples, base station 105-*c* may monitor for a DMRS during a first portion of the second TTI. In some examples, the second uplink message is rate-matched around the first portion of the second TTI.

At 455, base station 105-*c* may determine a duration for UE 115-*c* to retune from the first frequency band to the second frequency band. In some examples determining the duration for UE 115-*c* to retune includes determining the duration based at least in part on a longest retuning time among UEs operating within the system bandwidth. Base station 105-*c* may detect part of the second uplink message within the first portion of the second TTI, such that determining the duration for UE 115-*c* to retune may be based on detecting the part of the second uplink message. In some cases, base station 105-*c* may detect the second uplink message based on receiving the DRMS in the first portion of the second TTI, such that determining the duration for UE 115-*c* to retune may be based on receiving the DMRS, and such that the second uplink message may be received during a second portion of the second TTI. In some cases, the duration may be determined based on the signaling in 435. In some cases, base station 105-*c* may identify a CE requirement for UE 115-*c*, such that the duration for the UE to retune may be determined based on the CE requirement.

At 460, base station 105-*c* may decode the second uplink message based on the determined duration.

Figure 5:
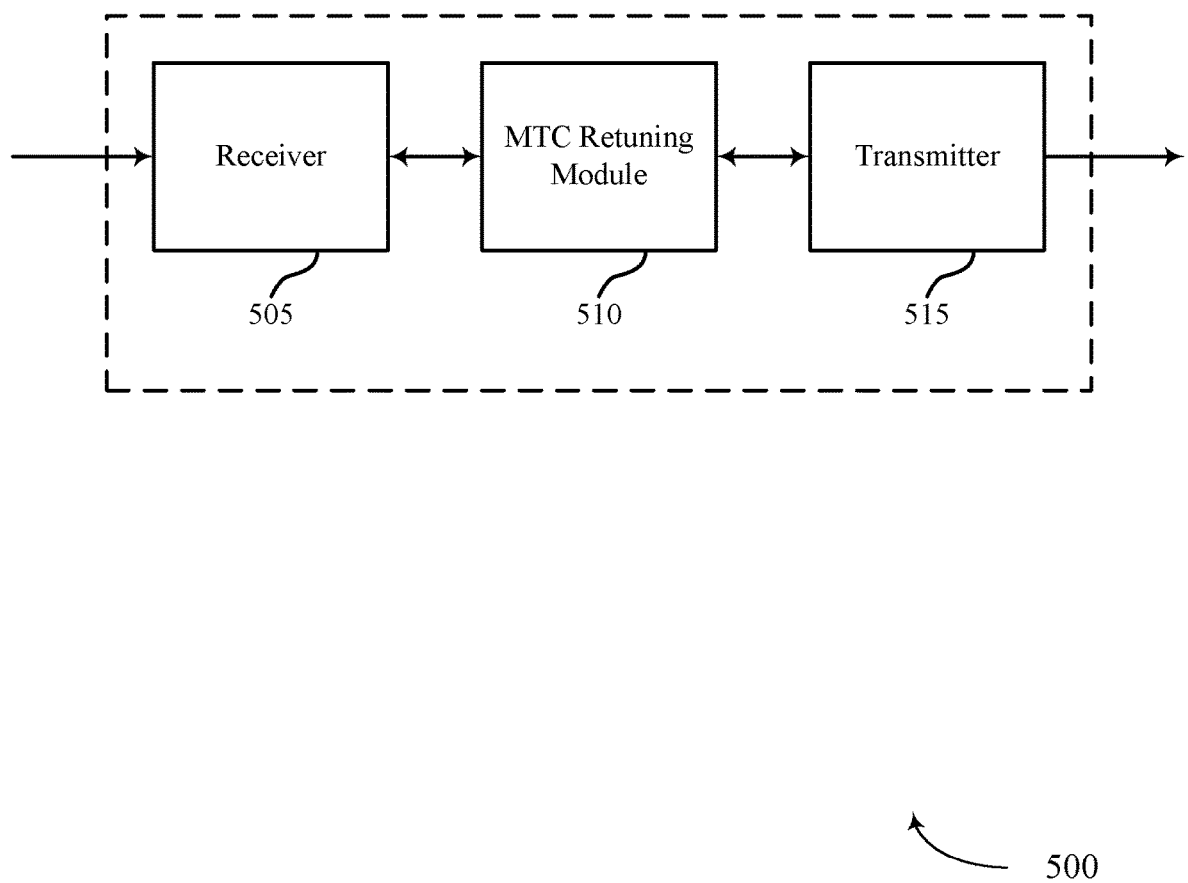
FIGS. 5-7 show block diagrams of a wireless device that supports retuning for eMTC in accordance with various aspects of the present disclosure.

FIG. 5 shows a block diagram of a wireless device 500 that supports retuning for eMTC in accordance with various aspects of the present disclosure. Wireless device 500 may be an example of aspects of a UE 115 described with reference to FIGS. 1-4. Wireless device 500 may include a receiver 505, a MTC retuning module 510, or a transmitter 515. Wireless device 500 may also include a processor. Each of these components may be in communication with one another.

The receiver 505 may receive information such as packets, user data, or control information associated with various information channels (e.g., control channels, data channels, and information related to retuning for eMTC, etc.). Information may be passed on to the MTC retuning module 510, and to other components of wireless device 500.

The MTC retuning module 510 may transmit a first uplink message during a TTI in a first frequency band of a system bandwidth, retune a transmitter to a second frequency band of the system bandwidth during a first portion of a second TTI, and transmit a second uplink message during a second portion of the second TTI in the second frequency band. MTC retuning module 510 may receive a first downlink message during a first TTI in a first frequency band of a system bandwidth, retune a receiver transmitter to a second frequency band of the system bandwidth during a first portion of a second TTI, and receive a second downlink message during a second portion of the second TTI in the second frequency band.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
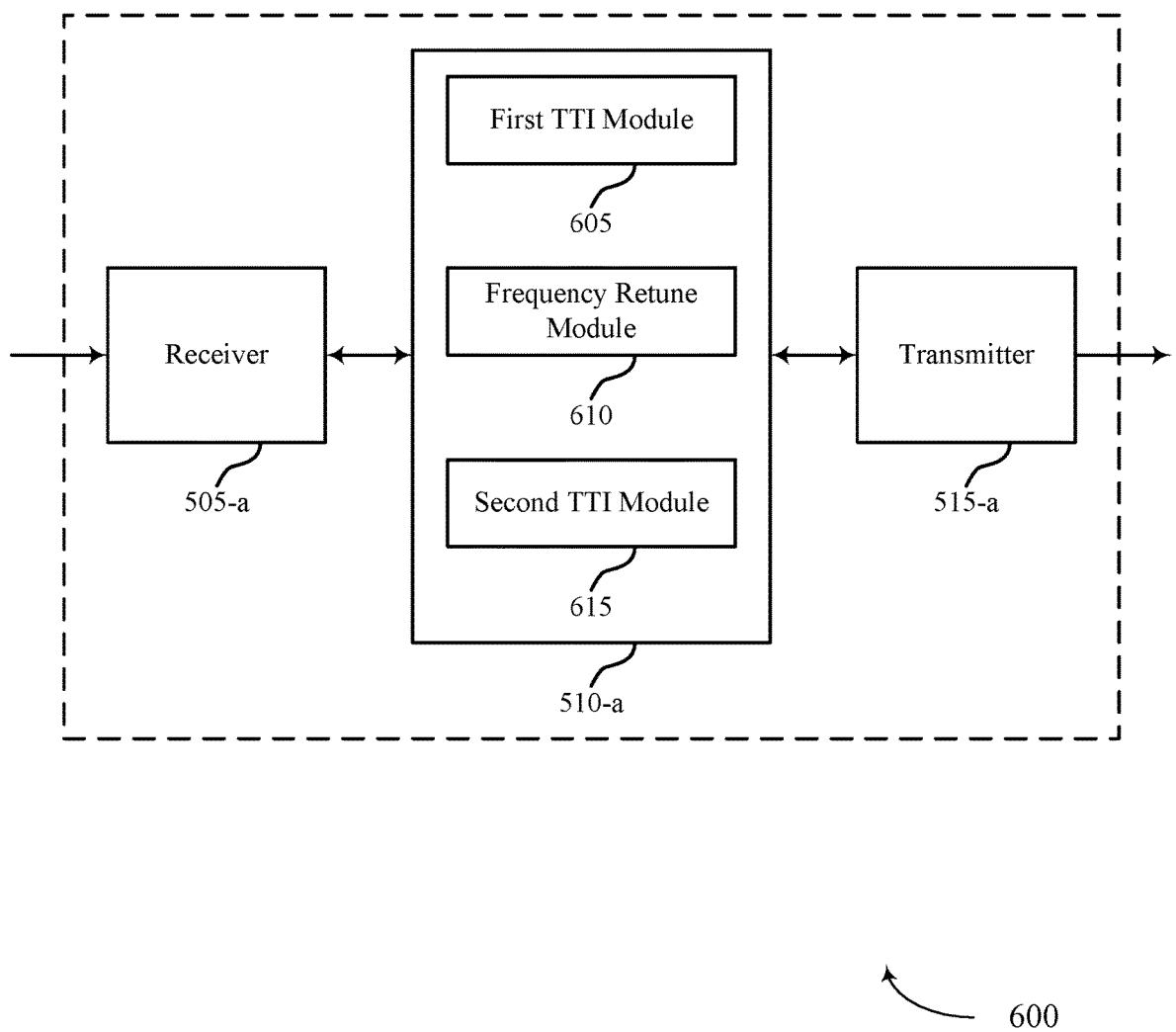

FIG. 6 shows a block diagram of a wireless device 600 that supports retuning for eMTC in accordance with various aspects of the present disclosure. Wireless device 600 may be an example of aspects of a wireless device 500 or a UE 115 described with reference to FIGS. 1-5. Wireless device 600 may include a receiver 505-*a*, a MTC retuning module 510-*a*, or a transmitter 515-*a*. Wireless device 600 may also include a processor. Each of these components may be in communication with each other. The MTC retuning module 510-*a* may also include a first TTI module 605, a frequency retune module 610, and a second TTI module 615.

The receiver 505-*a* may receive information which may be passed on to MTC retuning module 510-*a*, and to other components of wireless device 600. The MTC retuning module 510-*a* may perform the operations described with reference to FIG. 5. The transmitter 515-*a* may transmit signals received from other components of wireless device 600.

The first TTI module 605 may, in combination with transmitter 515, transmit a first uplink message during a TTI in a first frequency band of a system bandwidth as described with reference to FIGS. 2-4. The first TTI module 605 may also, in combination with receiver 505, receive a first downlink message during a TTI in a first frequency band of a system bandwidth as described with reference to FIGS. 2-4. The first TTI module 605 may communicate with a base station during a portion of a first TTI that includes an SRS and resources scheduled for a different UEs (e.g., a UE operating according to Release 8 of the LTE standard) in a first frequency band. The first TTI module 605 may also receive a first uplink message from a UE during a first TTI in a first frequency band of a system bandwidth. In some cases, the first TTI module 605 also determines whether a portion of the first TTI includes an SRS. In some examples, the first TTI module 605 may, in combination with transmitter 515, transmit a first message during a first TTI in a first frequency band. Or, the first TTI module 605, in combination with receiver 505, may receive a first message during a third TTI in a second frequency band.

The frequency retune module 610 may retune transmitter 515-*a* to a second frequency band of the system bandwidth during a first portion of a second TTI, as described with reference to FIGS. 2-4. The frequency retune module 610 may also retune receiver 505-*a* to a second frequency band of the system bandwidth during a first portion of a second TTI. The frequency retune module 610 may retune to a second frequency band during a duration of the SRS, for example. The frequency retune module 610 may, in some cases, determine a duration for the UE to retune from the first frequency band to the second frequency band. In some examples, determining the duration for the UE to retune includes determining the duration based on a specified retuning time among UE (e.g., a retuning time specified by a standard). In some examples, the specified retuning time may be based on a longest retuning time for UEs connected to a base station or operating within a system. In some cases, the frequency retune module 610 may determine that a TTI is designated for tuning from a first frequency band of a system bandwidth to a second frequency band of the system bandwidth. In some examples, the frequency retune module 610 may tune from the first frequency band to the second frequency band during an initial symbol period of the TTI.

The frequency retune module 610 may retune a transmitter or a receiver to a second frequency band during a second TTI.

The second TTI module 615 may, in combination with transmitter 515-*a*, transmit a second uplink message during a second portion of the second TTI in the second frequency band as described with reference to FIGS. 2-4. In some examples, a duration of the first portion of the second TTI may be based at least in part on a longest retuning time among UEs operating with the system bandwidth, or on a specified retuning time, or both. Transmitting the second uplink message may include rate-matching around the first portion of a second TTI, for instance. In some examples, a duration of the first portion of the second TTI is based at least in part on a retuning capability of the transmitter 515-*a*. In some examples, the second portion of the second TTI (e.g., a data region) may be punctured by the first portion of the second TTI (e.g., a control region). The second TTI module 615 may, in combination with transmitter 515-*a*, also transmit a DMRS in a third portion of the second TTI, which may follow the first portion (e.g., a retuning portion) and precede the second portion (e.g., the data region) of the second TTI. The second TTI module 615 may also determine a duration of the first portion (e.g., a retuning portion) of the second TTI based at least in part on the CE requirement for a UE. In some cases, the second TTI module 615 may receive reference signals in symbols of the TTI other than the initial symbol period of the TTI.

In some examples, the second TTI module 615 may, in combination with a transmitter 515 or a receiver 505, transmit or receive a second message during a third TTI in a second frequency band.

The second TTI module 615 may, in some cases and in combination with receiver 505-*a*, receive a second downlink message during a second portion of the second TTI in the second frequency band as described with reference to FIGS. 2-4. In some examples, the first portion of the second TTI includes a control region and part of a data region of the second TTI. The second TTI module 615 may also determine that the first portion of the second TTI includes part of the second downlink message. Additionally or alternatively, the second TTI module 615 may decode the second downlink message based on an assumption that the second downlink message is punctured by symbols that include other data (e.g., data schedule for other UEs). In some examples, the second downlink message may be rate-matched around the first downlink message.

By way of example, the second TTI module 615 may also communicate with the base station during a portion of a second TTI in the second frequency band. The second TTI module 615 may determine a duration of the first portion of the second TTI based on a specified retuning time among UEs (e.g., a retuning time specified by a standard, by a network operator, etc.). In some examples, the first portion of the second TTI includes a control region and part of a data region of the second TTI. The second TTI module 615 may also determine that a duration of the first portion of the second TTI includes a control region of the second TTI. In some cases, the second TTI module 615 determines a duration of the first portion of the second TTI based on the retuning capability. The second TTI module 615 may also determine a duration of the first portion of the second TTI based on the CE requirement.

Figure 7:
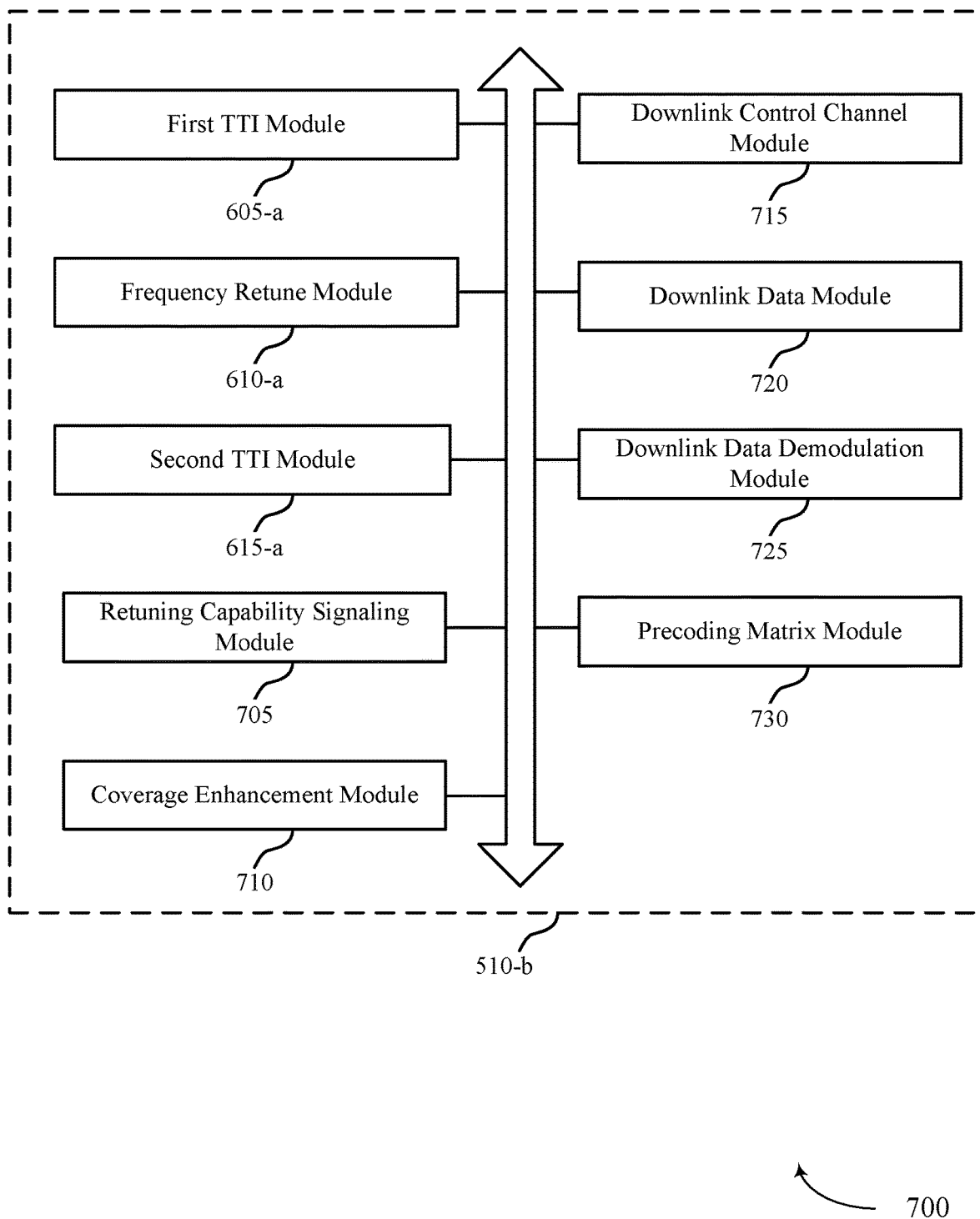

FIG. 7 shows a block diagram 700 of a MTC retuning module 510-*b* which may be a component of a wireless device 500 or a wireless device 600 that supports retuning for eMTC in accordance with various aspects of the present disclosure. The MTC retuning module 510-*b* may be an example of aspects of a MTC retuning module 510 described with reference to FIGS. 5-6. The MTC retuning module 510-*b* may include a first TTI module 605-*a*, a frequency retune module 610-*a*, and a second TTI module 615-*a*. Each of these modules may perform the functions described with reference to FIG. 6. The MTC retuning module 510-*b* may also include a retuning capability signaling module 705, a CE module 710, a downlink control channel module 715, a downlink data module 720, a downlink data demodulation module 725, and a precoding matrix module 730.

The retuning capability signaling module 705 may, in combination with a transmitter 515, transmit signaling indicative of a retuning capability, and a duration of the first portion of the second TTI is based on the retuning capability as described with reference to FIGS. 2-4. The retuning capability signaling module 705 may also transmit signaling indicative of a retuning capability, and a duration of the first portion of the second TTI may be based on the retuning capability. The retuning capability signaling module 705 may receive signaling from the UE; the signaling may be indicative of the duration for the UE to retune, and, in some cases, the duration is determined based on the signaling.

The CE module 710 may identify a CE requirement as described with reference to FIGS. 2-4. The CE module 710 may also identify a CE requirement for the UE, and the duration for the UE to retune is determined based on the CE requirement.

The downlink control channel module 715 may receive a downlink control channel during a first TTI; the downlink control channel may include a DMRS pattern, as described with reference to FIGS. 2-4. The downlink control channel module 715 may also communicate with a second UE during the portion of the first TTI in the first frequency band based on the determination.

The downlink data module 720 may receive a downlink data channel during a second TTI as described with reference to FIGS. 2-4. In some cases, the downlink data demodulation module 725 may demodulate data of the downlink data channel using at least the DMRS pattern of the downlink control channel as described with reference to FIGS. 2-4. Additionally or alternatively, the precoding matrix module 730 may determine a precoding matrix for the downlink channel, and the data may be demodulated using at least a CRS pattern of the downlink control channel and the CRS pattern of a downlink data channel as described with reference to FIGS. 2-4.

Figure 8:
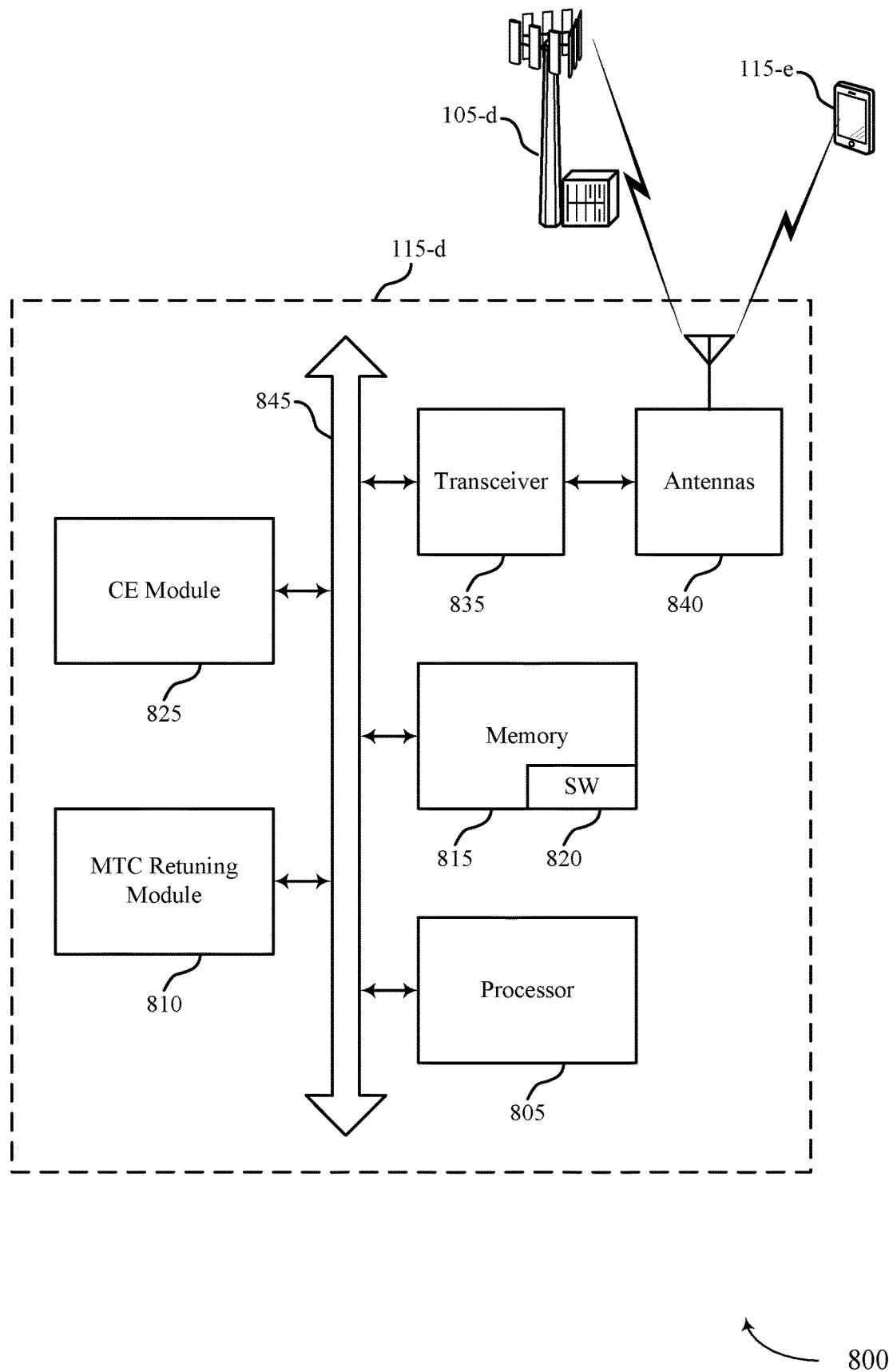
FIG. 8 illustrates a block diagram of a system including a user equipment (UE) that supports retuning for MTC in accordance with various aspects of the present disclosure.

FIG. 8 shows a diagram of a system 800, including a UE that supports eMTC, in accordance with various aspects of the present disclosure. System 800 may include UE 115-*d*, which may be an example of a wireless device 500, a wireless device 600, or a UE 115 described with reference to FIGS. 1, 2 and 5-7. UE 115-*d* may include a MTC retuning module 810, which may be an example of a MTC retuning module 510 described with reference to FIGS. 5-7. UE 115-*d* may also include a CE module 825, which may support various CEs, including bundled transmissions, and the like. UE 115-*d* may also include components for bi-directional voice and data communications including components for transmitting communications and components for receiving communications. For example, UE 115-*d* may communicate bi-directionally with base station 105-*d* or UE 115-*e*.

UE 115-*d* may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-d may include a single antenna 840, UE 115-d may also have multiple antennas 840 capable of concurrently transmitting or receiving multiple wireless transmissions.

In some examples, MTC retuning module 810 may perform various operations to avoid a necessity of rate-matching or puncturing during a retuning operation. For instance, MTC retuning module 810 may determine that a TTI is or includes a time interval during which a frequency hopping operation is to be performed and may retune a transmitter or receiver accordingly. In some examples, MTC retuning module 810 may determine that a TTI is configured for a different transmission direction than other TTIs and may adjust retuning operations accordingly.

The memory 815 may include random access memory (RAM) and read only memory (ROM). The memory 815 may store computer-readable, computer-executable software/firmware code 820 including instructions that, when executed, cause the processor 805 to perform various functions described herein (e.g., retuning for eMTC, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

Figure 9:
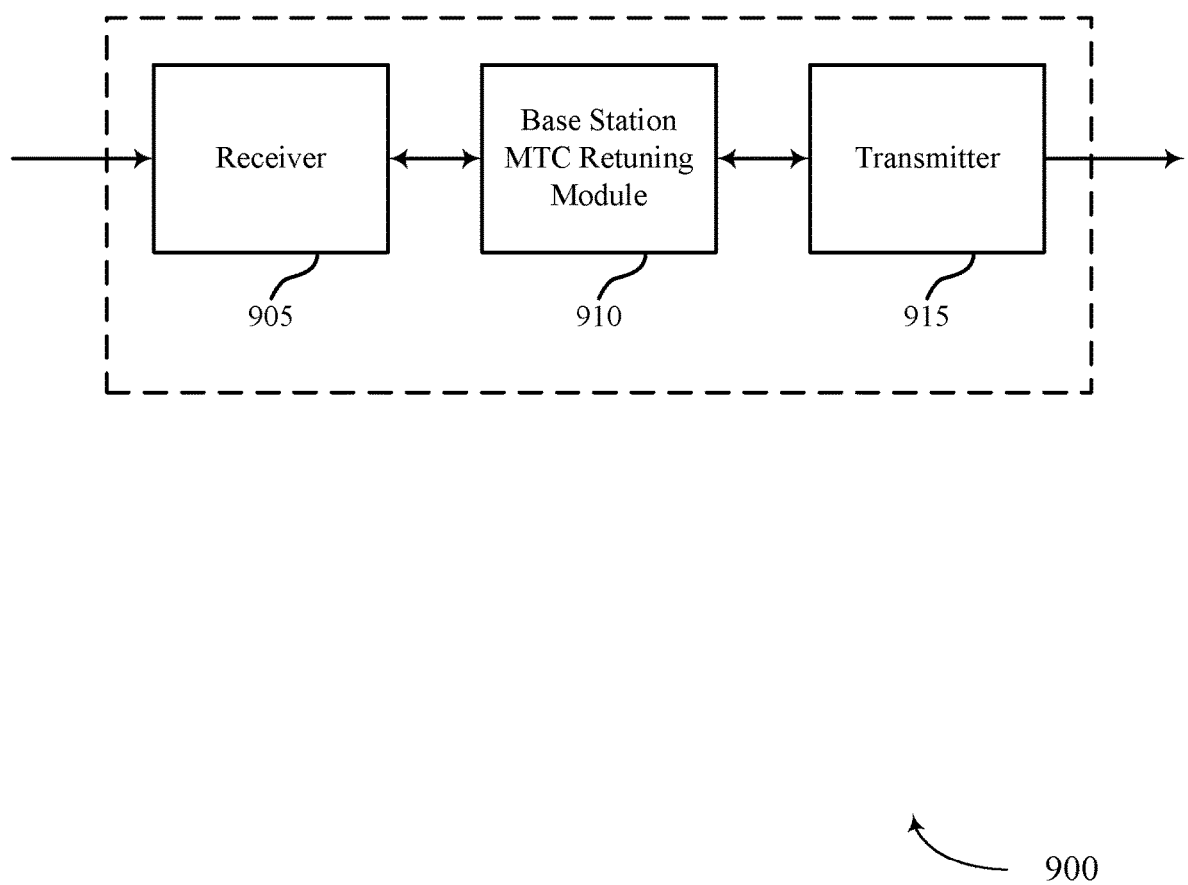
FIGS. 9-11 show block diagrams of a wireless device that supports retuning for MTC in accordance with various aspects of the present disclosure.

FIG. 9 shows a block diagram of a wireless device 900 that supports retuning for eMTC in accordance with various aspects of the present disclosure. Wireless device 900 may be an example of aspects of a base station 105 described with reference to FIGS. 1-8. Wireless device 900 may include a receiver 905, a base station MTC retuning module 910, or a transmitter 915. Wireless device 900 may also include a processor. Each of these components may be in communication with one another.

The receiver 905 may receive information such as packets, user data, or control information associated with various information channels (e.g., control channels, data channels, and information related to retuning for eMTC, etc.). Information may be passed on to the base station MTC retuning module 910, and to other components of wireless device 900.

The base station MTC retuning module 910 may transmit a first downlink message to a UE during a first TTI in a first frequency band of a system bandwidth, refrain from transmitting to the UE during a first portion of a second TTI to account for retuning by the UE, and transmit a second downlink message to the UE during a second portion of the second TTI in a second frequency band.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas.

Figure 10:
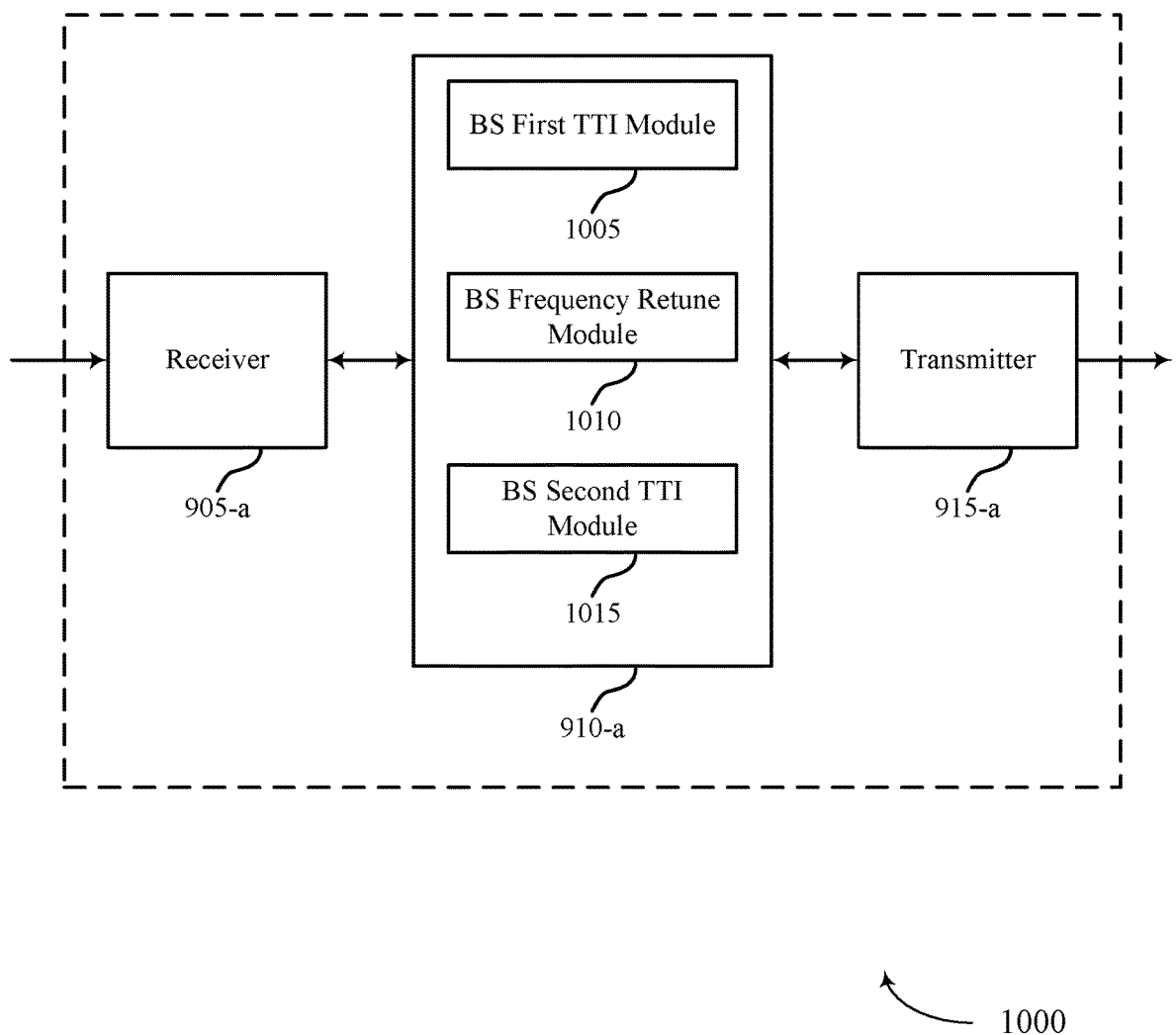

FIG. 10 shows a block diagram of a wireless device 1000 that supports retuning for eMTC in accordance with various aspects of the present disclosure. Wireless device 1000 may be an example of aspects of a wireless device 900 or a base station 105 described with reference to FIGS. 1-9. Wireless device 1000 may include a receiver 905-a, a base station MTC retuning module 910-a, or a transmitter 915-a. Wireless device 1000 may also include a processor. Each of these components may be in communication with one another. The base station MTC retuning module 910-a may also include a BS first TTI module 1005, a BS frequency retune module 1010, a BS second TTI module 1015, a BS downlink control channel module 1020, a BS downlink data module 1025, a control channel format signaling module 1030, a control signal configuration module 1035, and a punctured data signal module 1040.

The receiver 905-a may receive information which may be passed on to base station MTC retuning module 910-a, and to other components of wireless device 1000. The base station MTC retuning module 910-a may perform the operations described with reference to FIG. 9. The transmitter 915-a may transmit signals received from other components of wireless device 1000.

The BS first TTI module 1005 may, in combination with transmitter 915-a, transmit a first downlink message to a UE during a first TTI in a first frequency band of a system bandwidth as described with reference to FIGS. 2-4.

The BS frequency retune module 1010 may refrain, or cause transmitter 915-a to refrain, from transmitting to the UE during a first portion of a second TTI to account for retuning by the UE as described with reference to FIGS. 2-4.

The BS second TTI module 1015 may, in combination with transmitter 915-a, transmit a second downlink message to the UE during a second portion of the second TTI in a second frequency band as described with reference to FIGS. 2-4. In some examples, the BS second TTI module 1015 may also receive a second uplink message from the UE during a second TTI in a second frequency band of the system bandwidth. The BS second TTI module 1015 may, in some cases, decode the second uplink message based on the determined duration. Additionally or alternatively, the BS second TTI module 1015 may monitor for the second uplink message during a first portion of the second TTI. The BS second TTI module 1015 may, in some cases, detect part of the second uplink message within the first portion of the second TTI, and determining the duration for the UE to retune may be based on detecting the part of the second uplink message.

In some cases, the BS second TTI module 1015 may monitor for a DMRS during a first portion of the second TTI. The BS second TTI module 1015 may detect the second uplink message based on, for example, receiving the DRMS in the first portion of the second TTI; and determining the duration for the UE to retune may be based on receiving the DMRS. In some examples, the second uplink message is received during a second portion of the second TTI. The second uplink message may be rate-matched around the first uplink message. The BS second TTI module 1015 may also communicate with the second UE during a portion of a second TTI in a second frequency band based on the determination.

Figure 11:
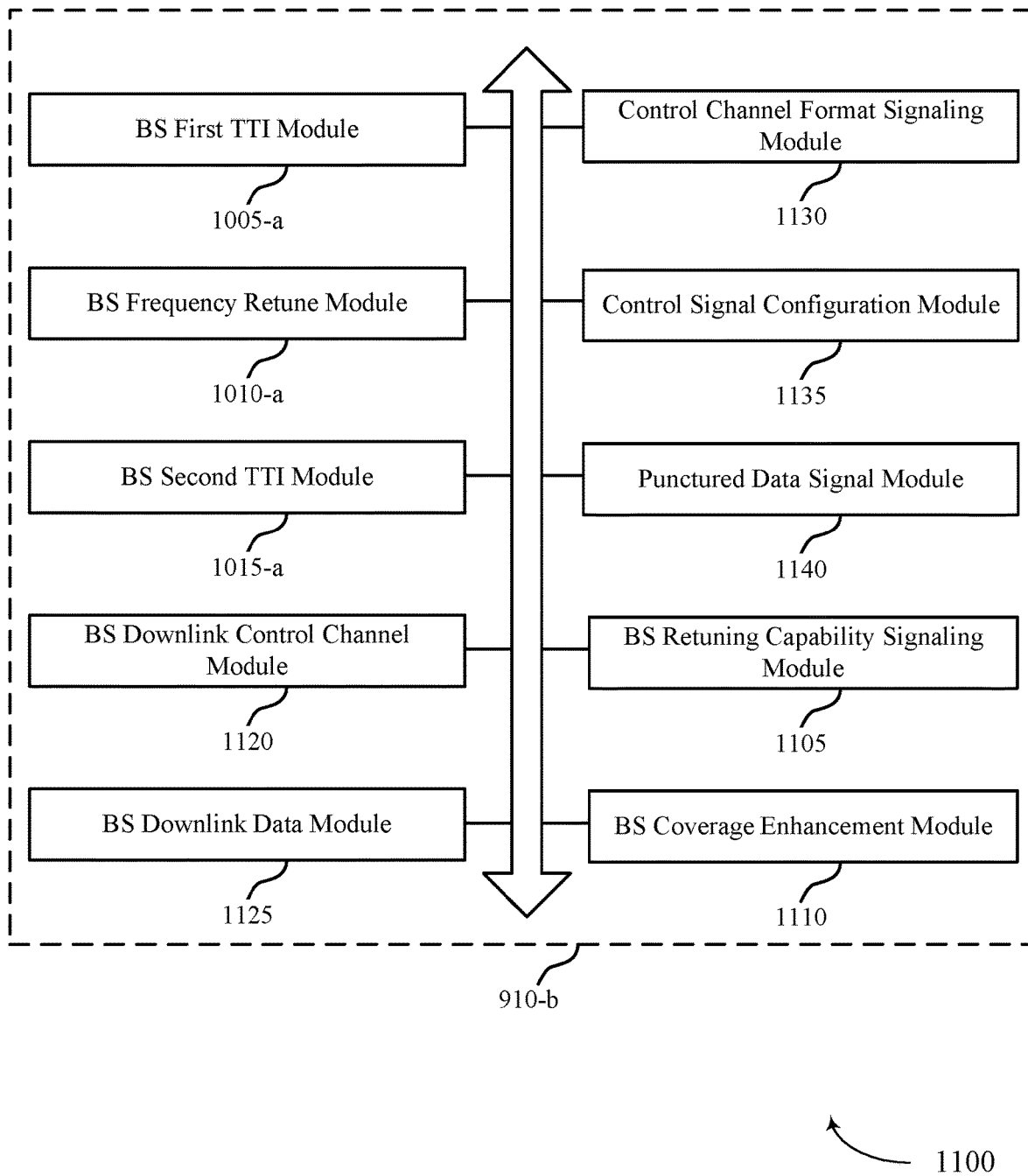

FIG. 11 shows a block diagram 1100 of a base station MTC retuning module 910-b which may be a component of a wireless device 900 or a wireless device 1000 that supports retuning for eMTC in accordance with various aspects of the present disclosure. The base station MTC retuning module 910-b may be an example of aspects of a base station MTC retuning module 910 described with reference to FIGS. 9-10. The base station MTC retuning module 910-b may include a BS first TTI module 1005-a, a BS frequency retune module 1010-*a*, a BS second TTI module 1015-*a*, a BS downlink control channel module 1020-*a*, a BS downlink data module 1025-*a*, a control channel format signaling module 1030-*a*, a control signal configuration module 1035-*a*, and a punctured data signal module 1040-*a*. Each of these modules may perform the functions described with reference to FIG. 10. The base station MTC retuning module 910-*b* may also include a BS retuning capability signaling module 1105, and a BS CE module 1110.

The BS retuning capability signaling module 1105 may receive signaling from the UE indicative of a retuning capability as described with reference to FIGS. 2-4. The BS CE module 1110 may identify a CE requirement for the UE as described with reference to FIGS. 2-4. In some cases, the BS downlink control channel module 1120 may transmit a downlink control channel during a first TTI, and the downlink control channel may include a DMRS pattern and may be transmitted using a precoder as described with reference to FIGS. 2-4.

The BS downlink data module 1125 may, in some cases, transmit a downlink data channel during a second TTI, and the downlink data channel may be transmitted using the precoder as described with reference to FIGS. 2-4. The control channel format signaling module 1130 may transmit signaling indicative of a control channel format to a UE as described with reference to FIGS. 2-4. The control signal configuration module 1135 may determine that a control signal exceeds the control channel format as described with reference to FIGS. 2-4. In some examples, the punctured data signal module 1140 may transmit a data signal to the UE, and the data signal may be punctured by a portion of the control signal as described with reference to FIGS. 2-4. In some examples, transmitting the data signal includes transmitting a power-boosted data signal.

Figure 12:
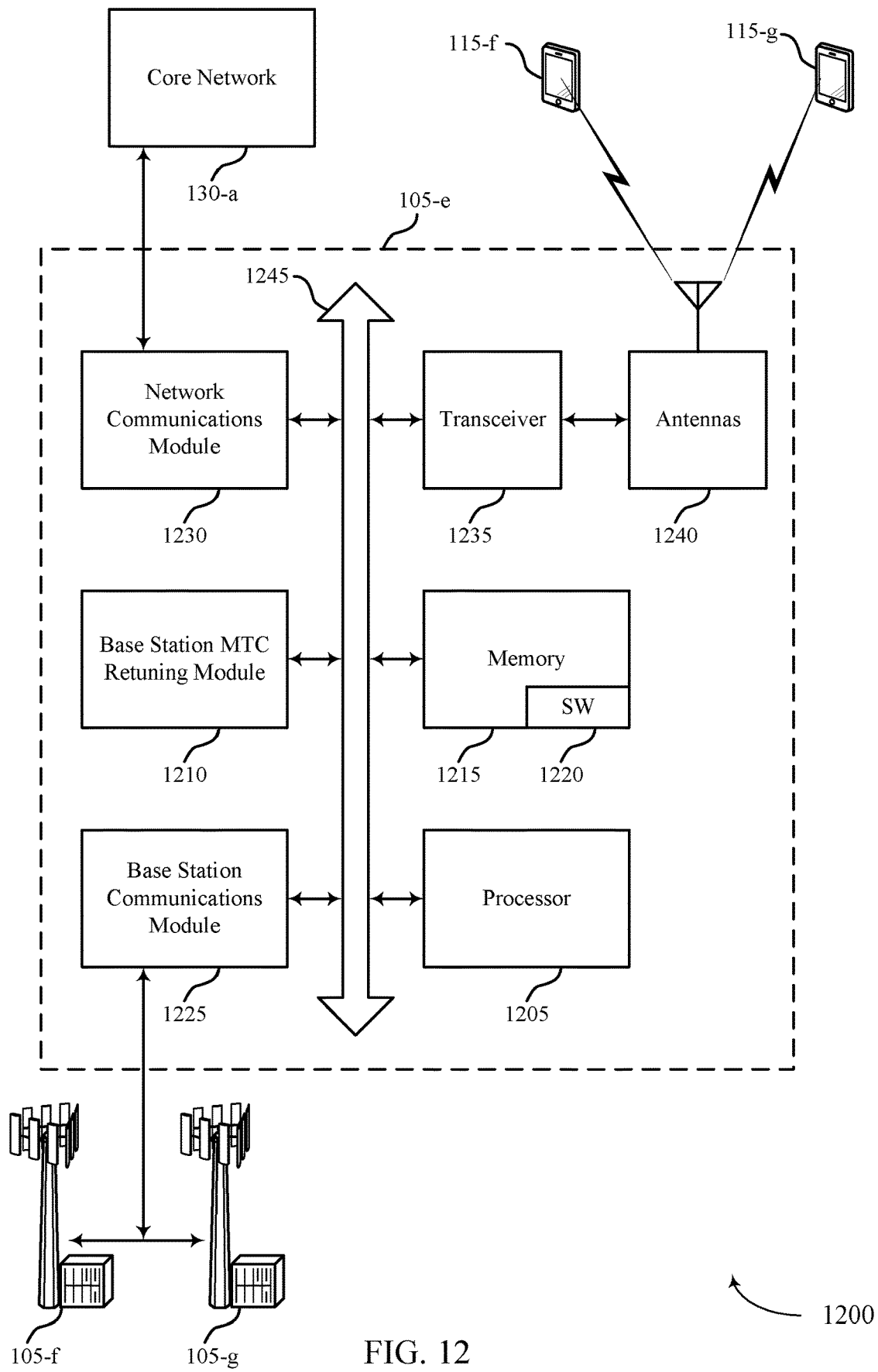
FIG. 12 illustrates a block diagram of a system including a base station that supports retuning for MTC in accordance with various aspects of the present disclosure.

FIG. 12 shows a diagram of a system 1200 including, a base station 105, that supports retuning for eMTC in accordance with various aspects of the present disclosure. System 1200 may include base station 105-*e*, which may be an example of a wireless device 900, a wireless device 1000, or a base station 105 described with reference to FIGS. 1, 2 and 9-11. Base Station 105-*e* may include a base station MTC retuning module 1210, which may be an example of a base station MTC retuning module 910 described with reference to FIGS. 9-11. Base Station 105-*e* may also include components for bi-directional voice and data communications including components for transmitting communications and components for receiving communications. For example, base station 105-*e* may communicate bi-directionally with UE 115-*f* or UE 115-*g*.

In some cases, base station 105-*e* may have one or more wired backhaul links. Base station 105-*e* may have a wired backhaul link (e.g., S1 interface, etc.) to the core network 130-*a*. Base station 105-*e* may also communicate with other base stations 105, such as base station 105-*f* and base station 105-*g* via inter-base station backhaul links (e.g., an X2 interface). Each of the base stations 105 may communicate with UEs 115 using the same or different wireless communications technologies. In some cases, base station 105-*e* may communicate with other base stations such as 105-*f* or 105-*g* utilizing base station communications module 1225. In some examples, base station communications module 1225 may provide an X2 interface within a Long Term Evolution (LTE)/LTE-A wireless communication network technology to provide communication between some of the base stations 105. In some examples, base station 105-*e* may communicate with other base stations through core network 130. In some cases, base station 105-*e* may communicate with the core network 130 through network communications module 1230.

The base station 105-*e* may include a processor 1205, memory 1215 (including software (SW) 1220), transceiver 1235, and antenna(s) 1240, which each may be in communication, directly or indirectly, with one another (e.g., over bus system 1245). The transceivers 1235 may be configured to communicate bi-directionally, via the antenna(s) 1240, with the UEs 115, which may be multi-mode devices. The transceiver 1235 (or other components of the base station 105-*e*) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-*e* may include multiple transceivers 1235, each with one or more associated antennas 1240. The transceiver may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor 1205 to perform various functions described herein (e.g., retuning for eMTC, selecting CE techniques, call processing, database management, message routing, etc.). Alternatively, the software 1220 may not be directly executable by the processor 1205 but be configured to cause the computer, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSPs), and the like.

In some examples, BS MTC retuning module 1210 may perform various operations to avoid a necessity of rate-matching or puncturing during a retuning operation. For instance, BS MTC retuning module 1210 may determine that a TTI is or includes a time interval during which a frequency hopping operation is to be performed and may retune a transmitter or receiver accordingly. In some examples, BS MTC retuning module 1210 may determine that a TTI is configured for a different transmission direction than other TTIs and may adjust retuning operations accordingly.

The base station communications module 1225 may manage communications with other base stations 105. In some cases, a communications management module may include a controller or scheduler for controlling communications with UEs 115 in cooperation with other base stations 105. For example, the base station communications module 1225 may coordinate scheduling for transmissions to UEs 115 for various interference mitigation techniques such as beamforming or joint transmission.

The components of wireless device 500, wireless device 600, and MTC retuning module 510-*b* may, UE 115-*d*, wireless device 900, wireless device 1000, BS MTC retuning module 910-*b*, and base station 105-*e* may each, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 13:
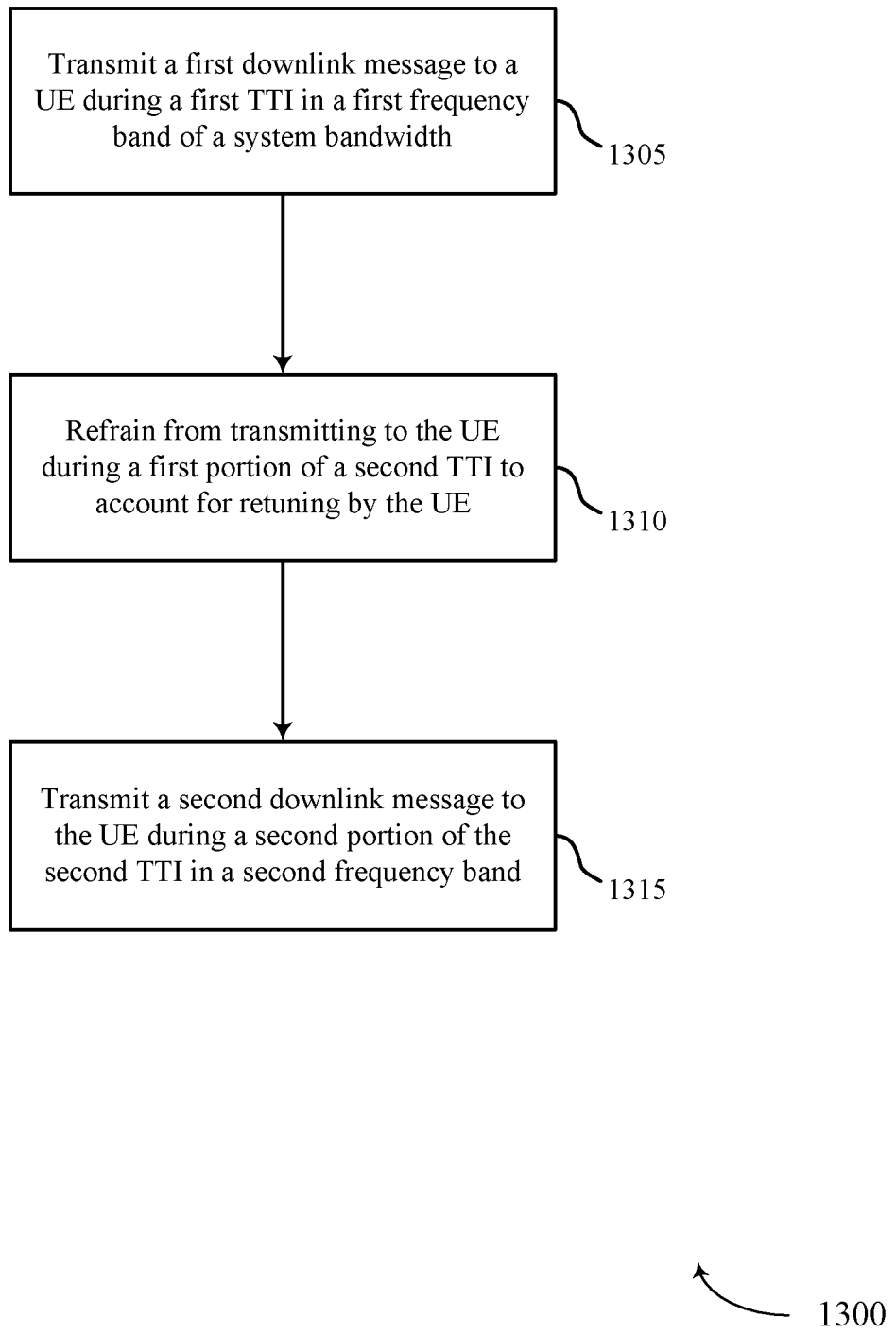
FIGS. 13-23 illustrate methods for retuning for MTC in accordance with various aspects of the present disclosure.

FIG. 13 shows a flowchart illustrating a method 1300 for retuning for eMTC in accordance with various aspects of the present disclosure. The operations of method 1300 may be implemented by a UE 115 or its components as described with reference to FIGS. 1-12. For example, the operations of method 1300 may be performed by the MTC retuning module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may transmit a first uplink message during a TTI in a first frequency band of a system bandwidth as described with reference to FIGS. 2-4. In certain examples, the operations of block 1305 may be performed by the first TTI module 605 as described with reference to FIG. 6.

At block 1310, the UE 115 may retune a transmitter to a second frequency band of the system bandwidth during a first portion of a second TTI as described with reference to FIGS. 2-4. In certain examples, the operations of block 1310 may be performed by the frequency retune module 610 as described with reference to FIG. 6.

At block 1315, the UE 115 may transmit a second uplink message during a second portion of the second TTI in the second frequency band as described with reference to FIGS. 2-4. In certain examples, the operations of block 1315 may be performed by the second TTI module 615 as described with reference to FIG. 6.

Figure 14:
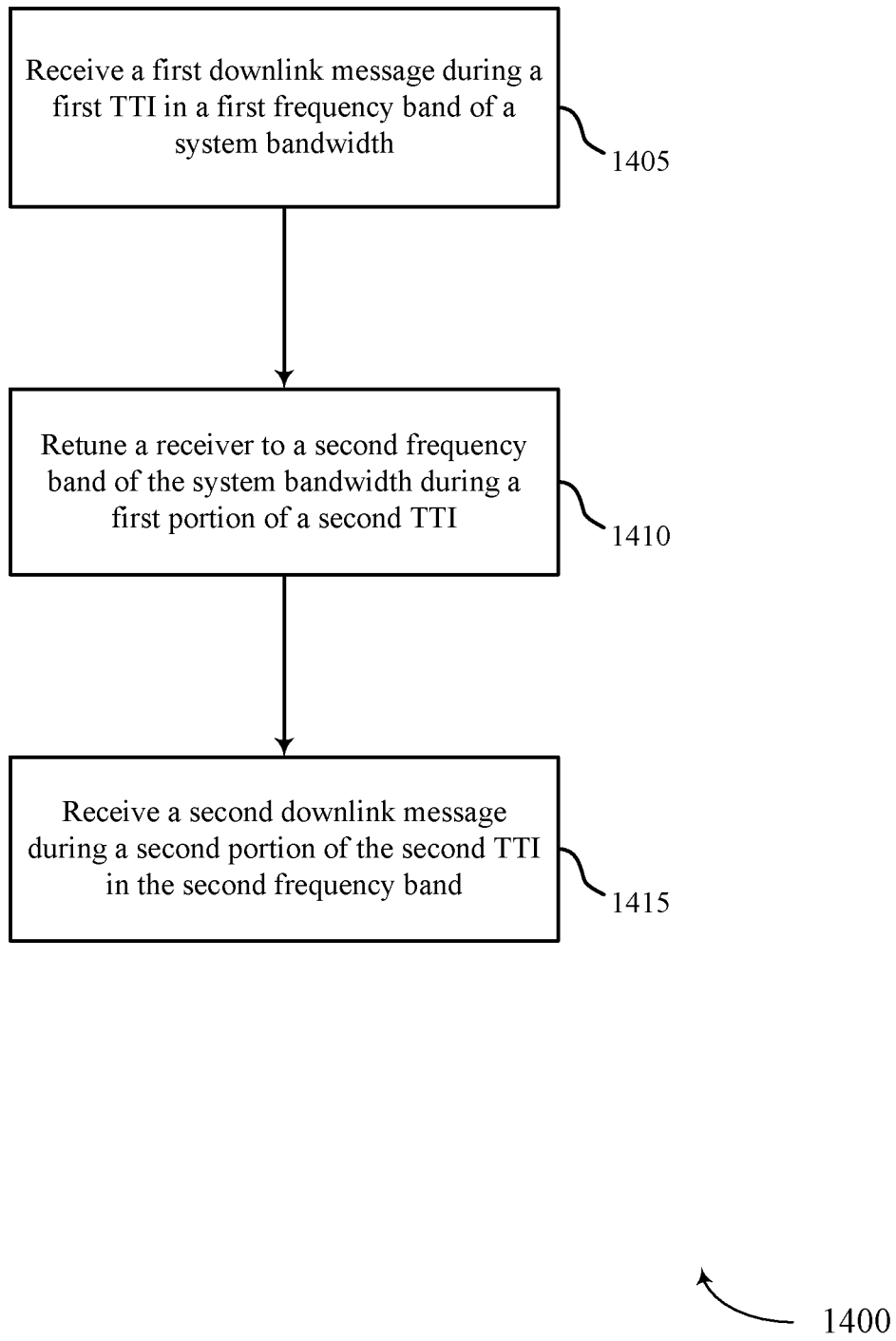

FIG. 14 shows a flowchart illustrating a method 1400 for retuning for eMTC in accordance with various aspects of the present disclosure. The operations of method 1400 may be implemented by a UE 115 or its components as described with reference to FIGS. 1-12. For example, the operations of method 1400 may be performed by the MTC retuning module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may receive a first downlink message during a first TTI in a first frequency band of a system bandwidth as described with reference to FIGS. 2-4. In certain examples, the operations of block 1405 may be performed by the first TTI module 605 as described with reference to FIG. 6.

At block 1410, the UE 115 may retune a receiver to a second frequency band of the system bandwidth during a first portion of a second TTI as described with reference to FIGS. 2-4. In certain examples, the operations of block 1410 may be performed by the frequency retune module 610 as described with reference to FIG. 6.

At block 1415, the UE 115 may receive a second downlink message during a second portion of the second TTI in the second frequency band as described with reference to FIGS. 2-4. In certain examples, the operations of block 1415 may be performed by the second TTI module 615 as described with reference to FIG. 6.

Figure 15:
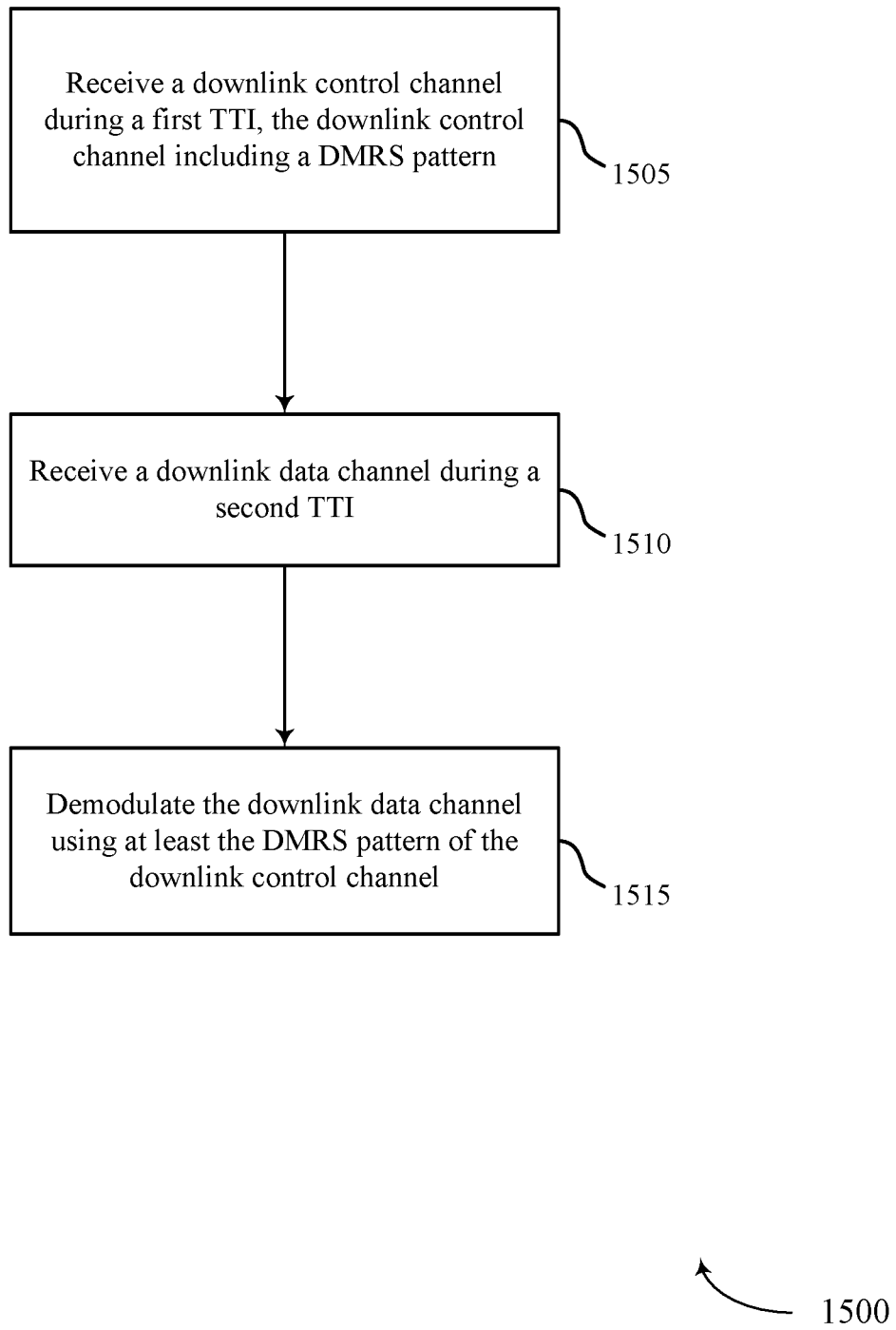

FIG. 15 shows a flowchart illustrating a method 1500 for enhanced CE operation in accordance with various aspects of the present disclosure. The operations of method 1500 may be implemented by a UE 115 or its components as described with reference to FIGS. 1-12. For example, the operations of method 1500 may be performed by the MTC retuning module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1505, the UE 115 may receive a downlink control channel during a first TTI, the downlink control channel comprising a DMRS pattern as described with reference to FIGS. 2-4. In certain examples, the operations of block 1505 may be performed by the downlink control channel module 715 as described with reference to FIG. 7.

At block 1510, the UE 115 may receive a downlink data channel during a second TTI as described with reference to FIGS. 2-4. In certain examples, the operations of block 1510 may be performed by the downlink data module 720 as described with reference to FIG. 7.

At block 1515, the UE 115 may demodulate data of the downlink data channel using at least the DMRS pattern of the downlink control channel as described with reference to FIGS. 2-4. In certain examples, the operations of block 1515 may be performed by the downlink data demodulation module 725 as described with reference to FIG. 7.

Figure 16:
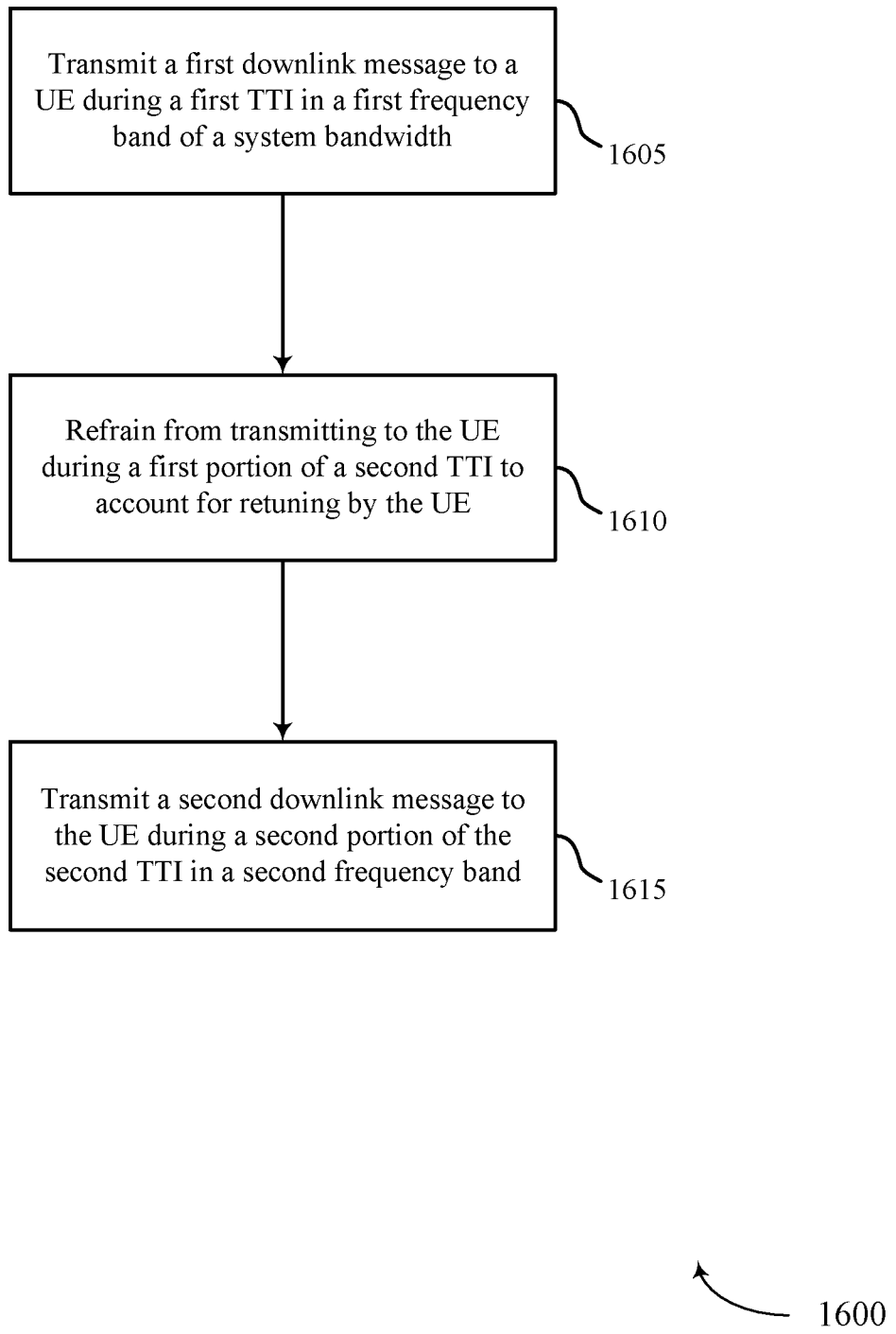

FIG. 16 shows a flowchart illustrating a method 1600 for retuning for eMTC in accordance with various aspects of the present disclosure. The operations of method 1600 may be implemented by a base station 105 or its components as described with reference to FIGS. 1-12. For example, the operations of method 1600 may be performed by the base station MTC retuning module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 1605, the base station 105 may transmit a first downlink message to a UE during a first TTI in a first frequency band of a system bandwidth as described with reference to FIGS. 2-4. In certain examples, the operations of block 1605 may be performed by the BS first TTI module 1005 as described with reference to FIG. 10.

At block 1610, the base station 105 may refrain from transmitting to the UE during a first portion of a second TTI to account for retuning by the UE as described with reference to FIGS. 2-4. In certain examples, the operations of block 1610 may be performed by the BS frequency retune module 1010 as described with reference to FIG. 10.

At block 1615, the base station 105 may transmit a second downlink message to the UE during a second portion of the second TTI in a second frequency band as described with reference to FIGS. 2-4. In certain examples, the operations of block 1615 may be performed by the BS second TTI module 1015 as described with reference to FIG. 10.

Figure 17:
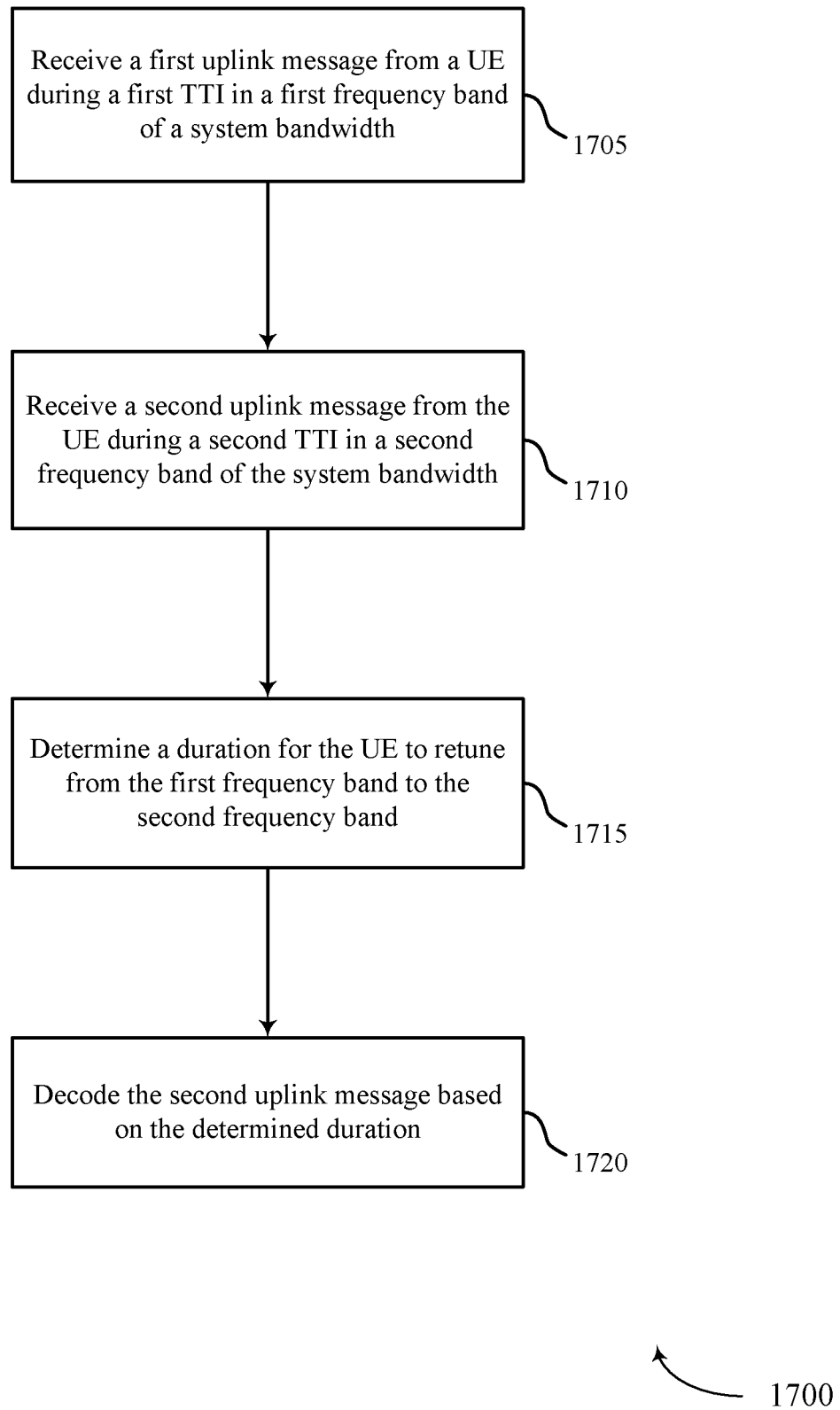

FIG. 17 shows a flowchart illustrating a method 1700 for retuning for eMTC in accordance with various aspects of the present disclosure. The operations of method 1700 may be implemented by a base station 105 or its components as described with reference to FIGS. 1-12. For example, the operations of method 1700 may be performed by the base station MTC retuning module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 1705, the base station 105 may receive a first uplink message from a UE during a first TTI in a first frequency band of a system bandwidth as described with reference to FIGS. 2-4. In certain examples, the operations of block 1705 may be performed by the first TTI module 605 as described with reference to FIG. 6.

At block 1710, the base station 105 may receive a second uplink message from the UE during a second TTI in a second frequency band of the system bandwidth as described with reference to FIGS. 2-4. In certain examples, the operations of block 1710 may be performed by the second TTI module 615 as described with reference to FIG. 6.

At block 1715, the base station 105 may determine a duration for the UE to retune from the first frequency band to the second frequency band as described with reference to FIGS. 2-4. In certain examples, the operations of block 1715 may be performed by the frequency retune module 610 as described with reference to FIG. 6.

At block 1720, the base station 105 may decode the second uplink message based at least in part on the determined duration as described with reference to FIGS. 2-4. In certain examples, the operations of block 1720 may be performed by the second TTI module 615 as described with reference to FIG. 6.

Figure 18:
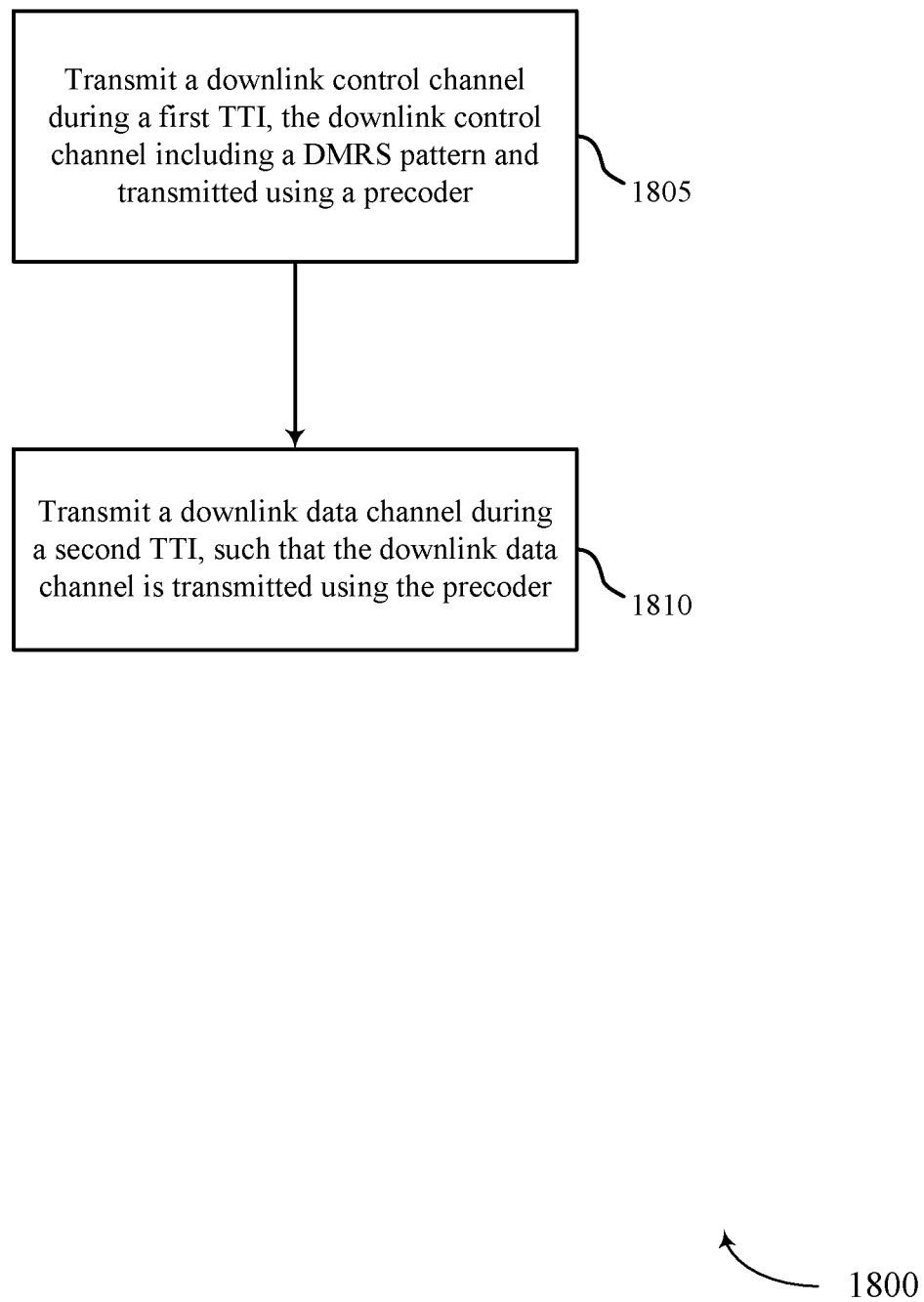

FIG. 18 shows a flowchart illustrating a method 1800 for enhanced CE operation in accordance with various aspects of the present disclosure. The operations of method 1800 may be implemented by a base station 105 or its components as described with reference to FIGS. 1-12. For example, the operations of method 1800 may be performed by the base station MTC retuning module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 1805, the base station 105 may transmit a downlink control channel during a first TTI, the downlink control channel comprising a DMRS pattern and transmitted using a precoder as described with reference to FIGS. 2-4. In certain examples, the operations of block 1805 may be performed by the BS downlink control channel module 1120 as described with reference to FIG. 11.

At block 1810, the base station 105 may transmit a downlink data channel during a second TTI, wherein the downlink data channel is transmitted using the precoder as described with reference to FIGS. 2-4. In certain examples, the operations of block 1810 may be performed by the BS downlink data module 1125 as described with reference to FIG. 11.

Figure 19:
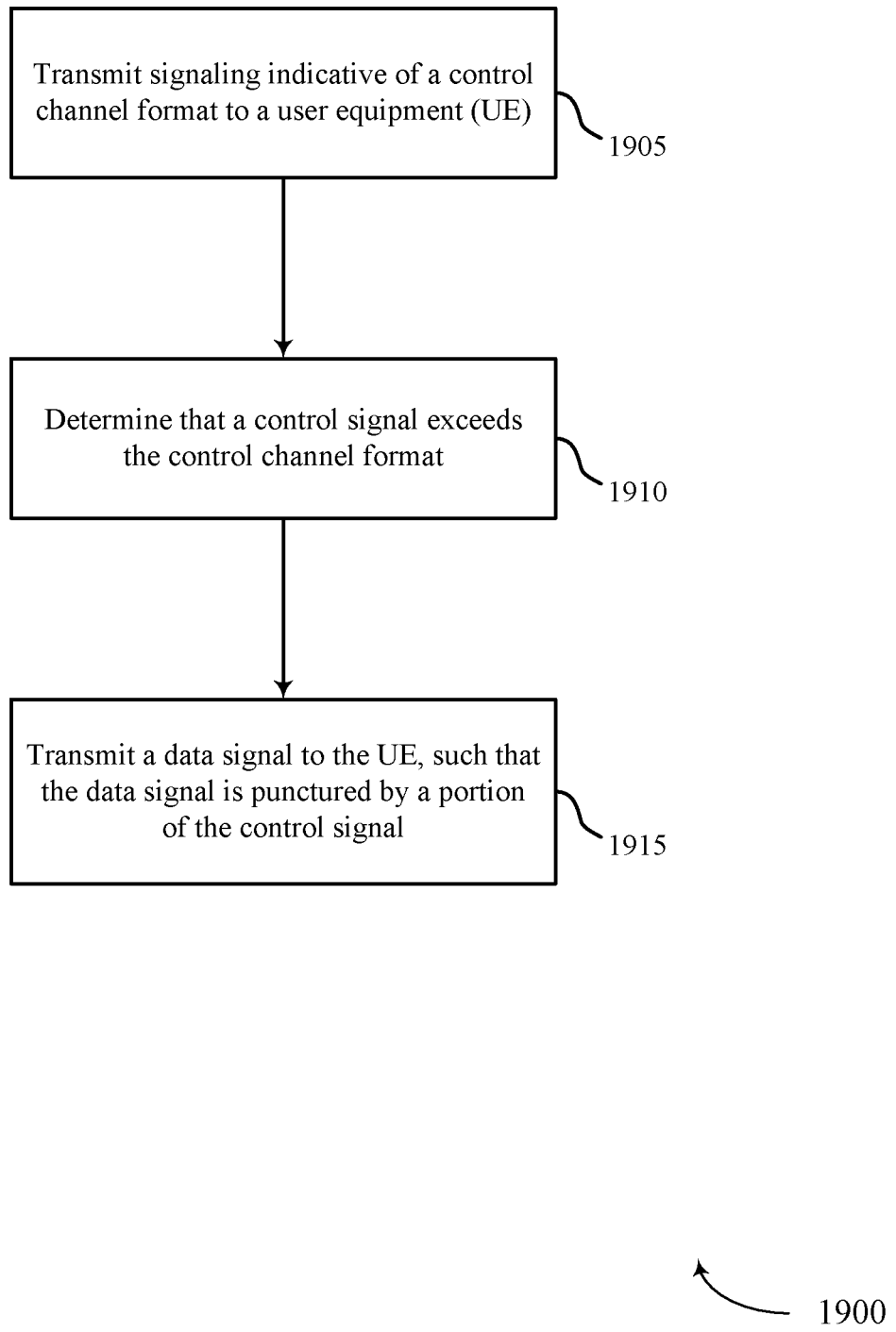

FIG. 19 shows a flowchart illustrating a method 1900 for CFI overriding in accordance with various aspects of the present disclosure. The operations of method 1900 may be implemented by a base station 105 or its components as described with reference to FIGS. 1-12. For example, the operations of method 1900 may be performed by the base station MTC retuning module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 1905, the base station 105 may transmit signaling indicative of a control channel format to a UE as described with reference to FIGS. 2-4. In certain examples, the operations of block 1905 may be performed by the control channel format signaling module 1130 as described with reference to FIG. 11.

At block 1910, the base station 105 may determine that a control signal exceeds the control channel format as described with reference to FIGS. 2-4. In certain examples, the operations of block 1910 may be performed by the control signal configuration module 1135 as described with reference to FIG. 11.

At block 1915, the base station 105 may transmit a data signal to the UE, wherein the data signal is punctured by a portion of the control signal as described with reference to FIGS. 2-4. In certain examples, the operations of block 1915 may be performed by the punctured data signal module 1140 as described with reference to FIG. 11.

Figure 20:
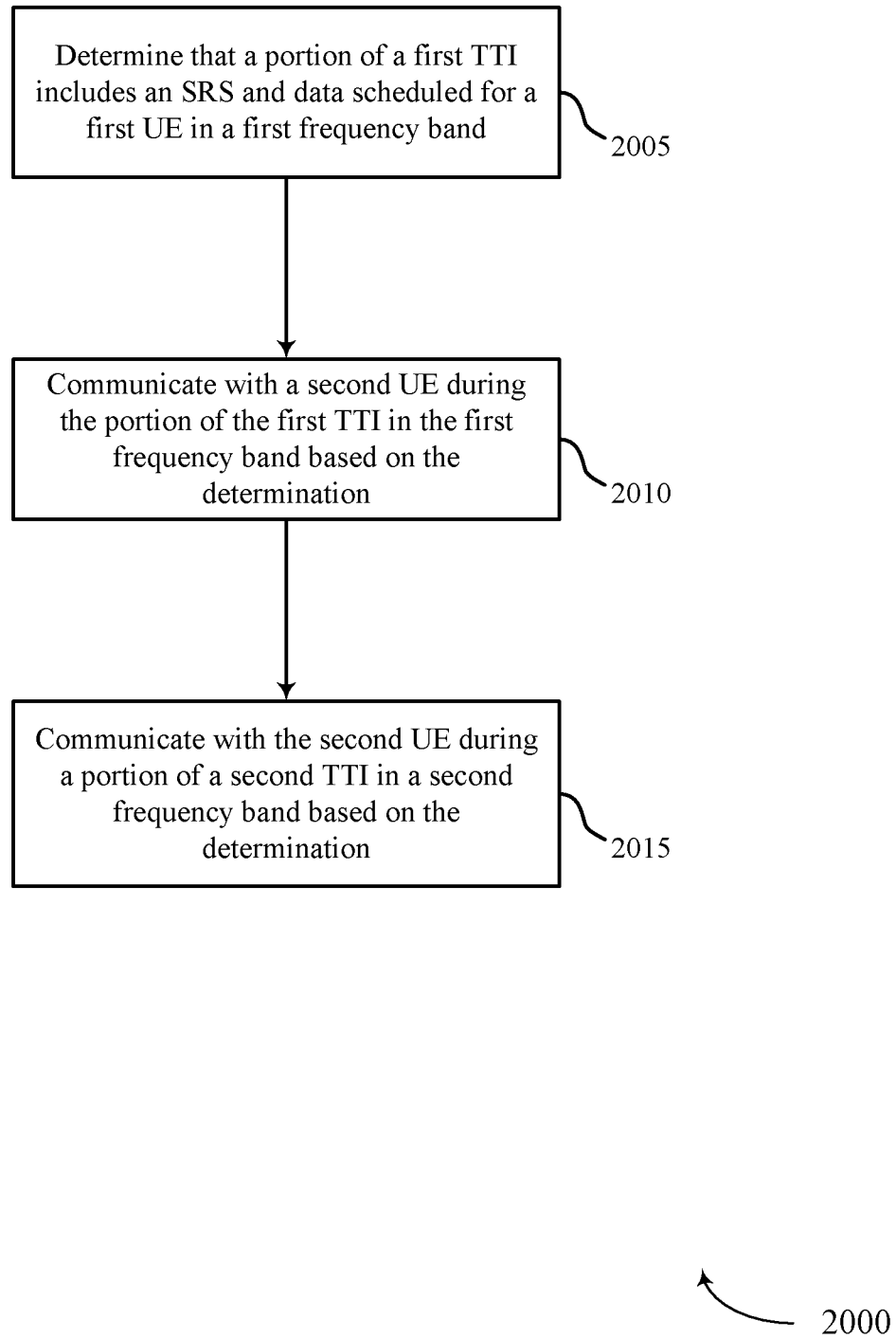

FIG. 20 shows a flowchart illustrating a method 2000 for retuning for eMTC in accordance with various aspects of the present disclosure. The operations of method 2000 may be implemented by a base station 105 or its components as described with reference to FIGS. 1-12. For example, the operations of method 2000 may be performed by the base station MTC retuning module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 2005, the base station 105 may determine that a portion of a first TTI includes a shortened PUCCH format (e.g., due to an SRS resource configuration) and data scheduled for a first UE in a first frequency band, as described with reference to FIGS. 2-4. In certain examples, the operations of block 2005 may be performed by the BS first TTI module 1005 as described with reference to FIG. 10.

At block 2010, the base station 105 may communicate with a second UE during the portion of the first TTI in the first frequency band based on the determination as described with reference to FIGS. 2-4. In certain examples, the operations of block 2010 may be performed by the BS second TTI module 1015 as described with reference to FIG. 10.

At block 2015, the base station 105 may communicate with the second UE during a portion of a second TTI in a second frequency band based on the determination, as described with reference to FIGS. 2-4. In certain examples, the operations of block 2015 may be performed by the BS second TTI module 1015 as described with reference to FIG. 10.

Figure 21:
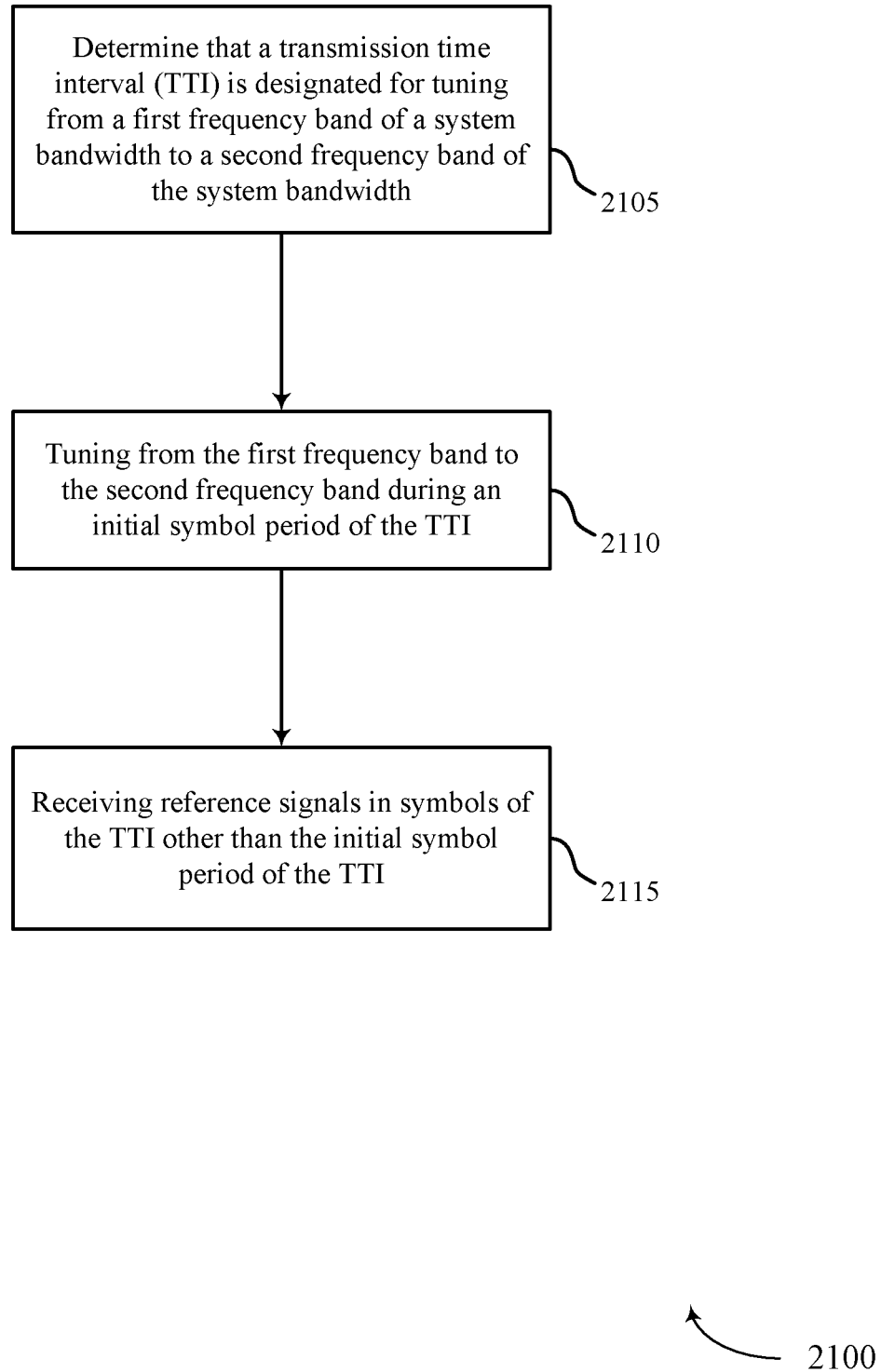

FIG. 21 shows a flowchart illustrating a method 2100 for retuning for eMTC in accordance with various aspects of the present disclosure. The operations of method 2100 may be implemented by a UE 115 or its components as described with reference to FIGS. 1-20. For example, the operations of method 2100 may be performed by the MTC retuning module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 2105, the UE 115 may determine that a TTI is designated for tuning from a first frequency band of a system bandwidth to a second frequency band of the system bandwidth as described with reference to FIGS. 2-4. In certain examples, the operations of block 2105 may be performed by the frequency retune module 610 as described with reference to FIG. 6.

At block 2110, the UE 115 may tune from the first frequency band to the second frequency band during an initial symbol period of the TTI as described with reference to FIGS. 2-4. In certain examples, the operations of block 2110 may be performed by the frequency retune module 610 as described with reference to FIG. 6.

At block 2115, the UE 115 may receive reference signals in symbols of the TTI other than the initial symbol period of the TTI as described with reference to FIGS. 2-4. In certain examples, the operations of block 2115 may be performed by the second TTI module 615 as described with reference to FIG. 6.

Figure 22:
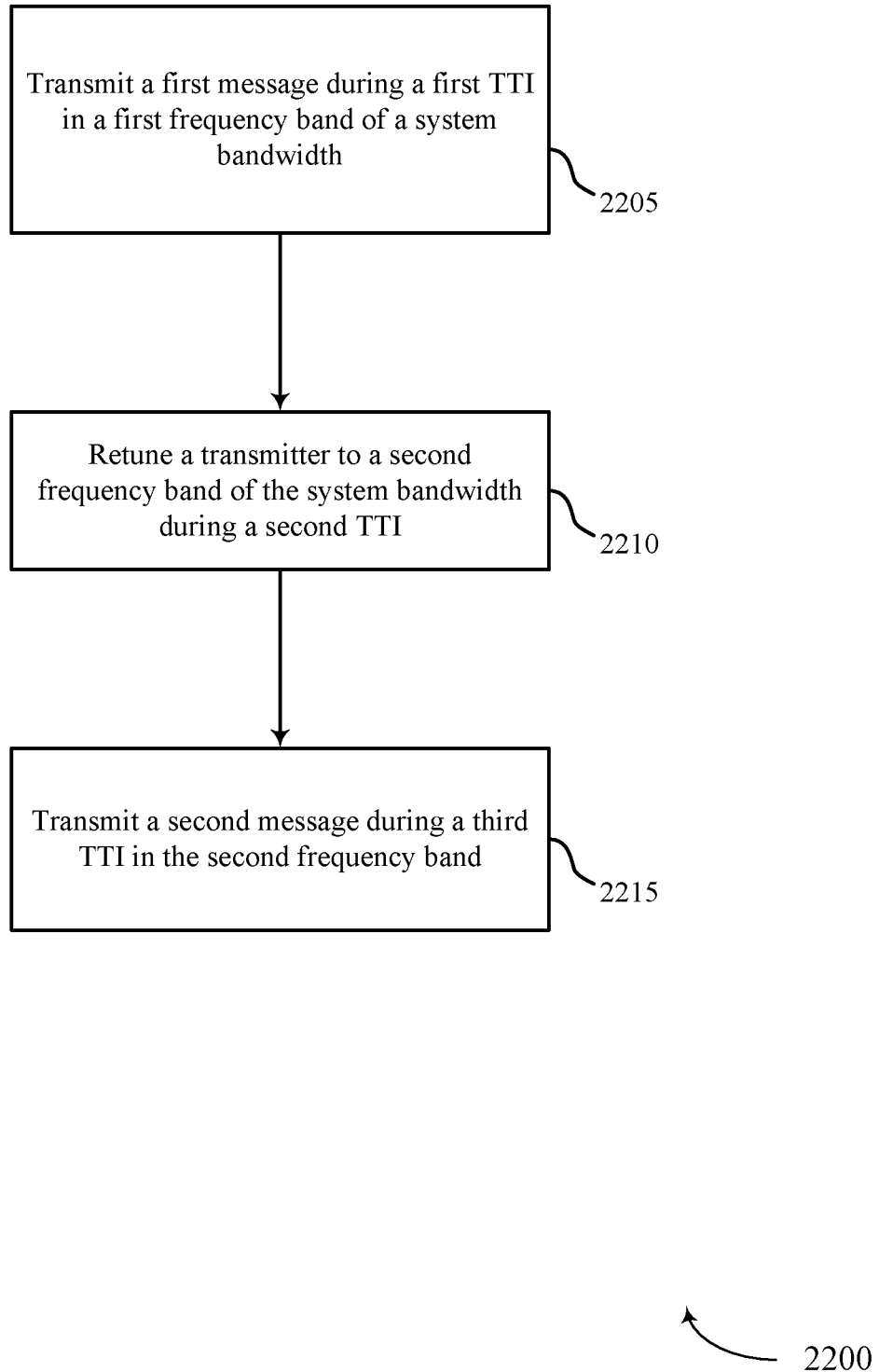
Figure 23:
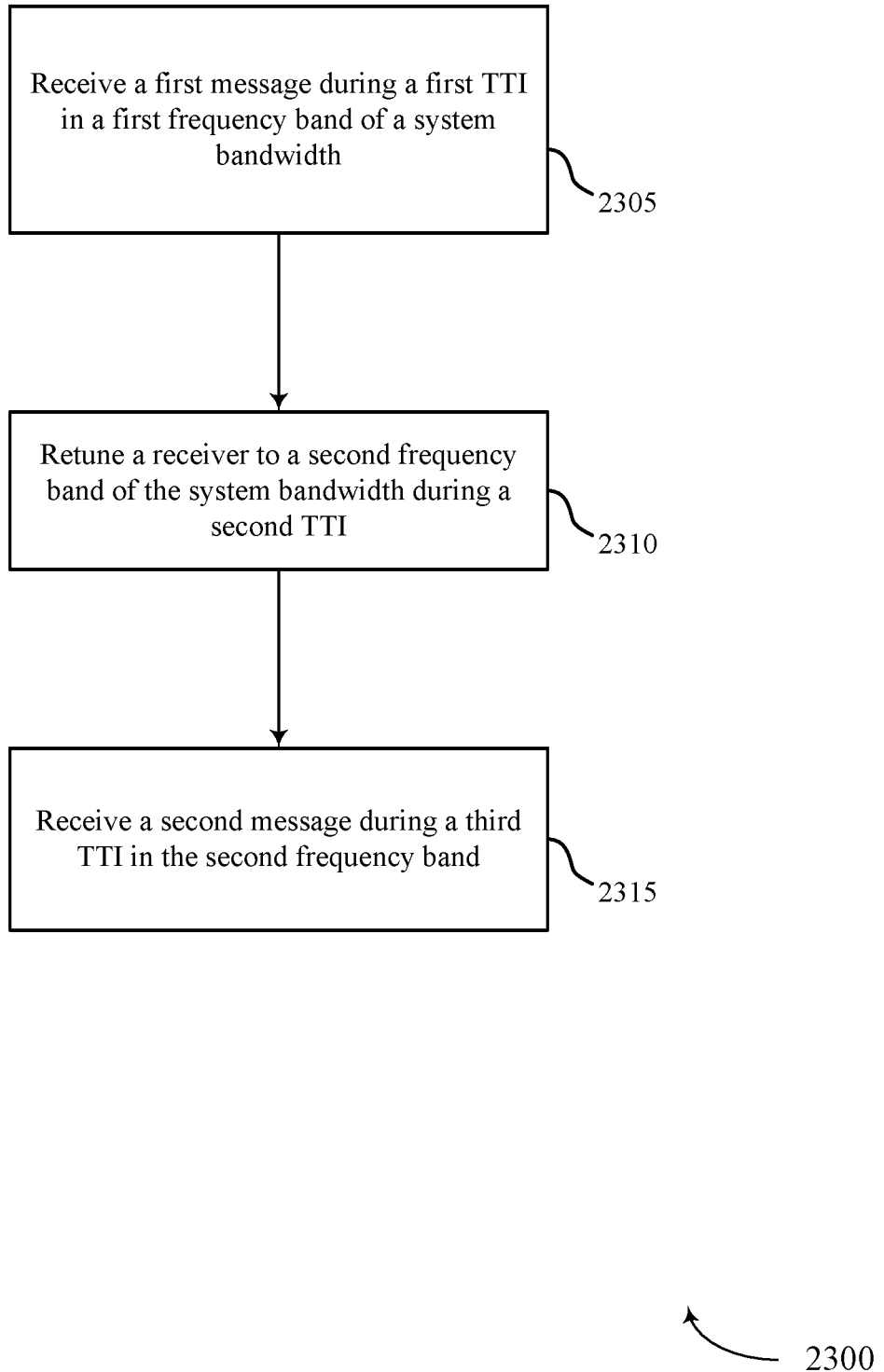

FIG. 22 shows a flowchart illustrating a method 2200 for retuning for eMTC in accordance with various aspects of the present disclosure. The operations of method 2200 may be implemented by a UE 115 or its components as described with reference to FIGS. 1-12. For example, the operations of method 2200 may be performed by the MTC retuning module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 2205, the UE 115 may transmit a first message during a first TTI in a first frequency band of a system bandwidth as described with reference to FIGS. 2-4. In certain examples, the operations of block 2205 may be performed by the first TTI module 605 as described with reference to FIG. 6.

At block 2210, the UE 115 may retune a transmitter to a second frequency band of the system bandwidth during a second TTI as described with reference to FIGS. 2-4. In certain examples, the operations of block 2210 may be performed by the frequency retune module 610 as described with reference to FIG. 6.

At block 2215, the UE 115 may transmit a second message during a third TTI in the second frequency band as described with reference to FIGS. 2-4. In certain examples, the operations of block 2215 may be performed by the second TTI module 615 as described with reference to FIG. 6.

FIG. 14 shows a flowchart illustrating a method 1400 for retuning for eMTC in accordance with various aspects of the present disclosure. The operations of method 2300 may be implemented by a UE 115 or its components as described with reference to FIGS. 1-12. For example, the operations of method 2300 may be performed by the MTC retuning module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 2305, the UE 115 may receive a first message during a first TTI in a first frequency band of a system bandwidth as described with reference to FIGS. 2-4. In certain examples, the operations of block 2205 may be performed by the first TTI module 605 as described with reference to FIG. 6.

At block 2310, the UE 115 may retune a receiver to a second frequency band of the system bandwidth during a second TTI as described with reference to FIGS. 2-4. In certain examples, the operations of block 2310 may be performed by the frequency retune module 610 as described with reference to FIG. 6.

At block 2315, the UE 115 may receive a second message during a third TTI in the second frequency band as described with reference to FIGS. 2-4. In certain examples, the operations of block 1415 may be performed by the second TTI module 615 as described with reference to FIG. 6.

Thus, methods 1300, 1400, 1500, 1600, 1700, 1800, 1900, 2000, 2100, 2200, and 2300 may provide for retuning for eMTC, and various CE and eMTC techniques. It should be noted that methods 1300, 1400, 1500, 1600, 1700, 1800, 1900, 2000, and 2100 describe possible implementation, and that the operations and the steps may be rearranged or otherwise modified such that other implementations are possible. In some examples, aspects from two or more of the methods 1300, 1400, 1500, 1600, 1700, 1800, 1900, 2000, and 2100 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, Universal Mobile Telecommunications System (UMTS), LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a user equipment (UE), comprising:
   transmitting a first uplink message during a first transmission time interval (TTI) in a first frequency band of a system bandwidth;
   determining a coverage enhancement (CE) of the UE and a number of symbols for the UE to retune based at least in part on the determined CE of the UE;
   transmitting, to a base station, signaling indicative of a retuning configuration of the UE, the retuning configuration comprising an indication of the number of symbols for the UE to retune;
   retuning a transmitter from the first frequency band to a second frequency band of the system bandwidth during a first portion of a second TTI, the first portion having a duration that is based at least in part on the CE of the UE and the duration for the UE to retune indicated by the retuning configuration; and
   transmitting a second uplink message during a second portion of the second TTI in the second frequency band.

2. The method of claim 1, wherein the duration of the first portion of the second TTI is based at least in part on a specified retuning time among UEs.

3. The method of claim 1, wherein transmitting the second uplink message comprises:
   rate-matching around the first portion of the second TTI.

4. The method of claim 1, wherein the second portion of the second TTI is punctured by the first portion of the second TTI.

5. A method of wireless communication at a user equipment (UE), comprising:
   receiving a first downlink message during a first transmission time interval (TTI) in a first frequency band of a system bandwidth;
   determining a coverage enhancement (CE) of the UE and a number of symbols for the UE to retune based at least in part on the determined CE of the UE;
   transmitting, to a base station, signaling indicative of a retuning configuration of the UE, the retuning configuration comprising an indication of the number of symbols for the UE to retune;
   retuning a receiver from the first frequency band to a second frequency band of the system bandwidth during a first portion of a second TTI, the first portion having a duration that is based at least in part on the CE of the UE and the duration for the UE to retune indicated by the retuning configuration; and
   receiving a second downlink message during a second portion of the second TTI in the second frequency band.

6. The method of claim 5, wherein the first portion of the second TTI comprises a control region and part of a data region of the second TTI.

7. The method of claim 6, further comprising:
   determining that the first portion of the second TTI comprises part of the second downlink message; and
   decoding the second downlink message based at least in part on an assumption that the second downlink message is punctured by symbols comprising other data.

8. The method of claim 5, wherein the second downlink message is rate-matched around the first downlink message.

9. The method of claim 5, wherein the first portion of the second TTI comprises an initial symbol period of the second TTI, and wherein the method comprises:
   receiving reference signals in symbols of the second TTI other than the initial symbol period of the second TTI.

10. The method of claim 9, further comprising:
    performing channel estimation, frequency tracking, or time tracking using the reference signals, wherein a pattern of the reference signals is based at least in part on a designation of the second TTI as being for tuning from the first to the second frequency band.

11. The method of claim 9, further comprising:
    receiving signaling indicating that the second TTI is designated for tuning from the first frequency band of the system bandwidth to the second frequency band of the system bandwidth.

12. The method of claim 11, wherein the signaling comprises system information.

13. An apparatus for wireless communication at a user equipment (UE), comprising:
- a processor;
- memory coupled with the processor; and
- instructions stored in the memory and operable, when executed by the processor, to cause the apparatus to:
  - transmit a first uplink message during a first transmission time interval (TTI) in a first frequency band of a system bandwidth;
  - determine a coverage enhancement (CE) of the UE and a number of symbols for the UE to retune based at least in part on the determined CE of the UE;
  - transmit, to a base station, signaling indicative of a retuning configuration of the UE, the retuning configuration comprising an indication of the number of symbols for the UE to retune;
  - retune a transmitter from the first frequency band to a second frequency band of the system bandwidth during a first portion of a second TTI, the first portion having a duration that is based at least in part on the CE of the UE and the duration for the UE to retune indicated by the retuning configuration; and
  - transmit a second uplink message during a second portion of the second TTI in the second frequency band.

14. The apparatus of claim 13, wherein the duration of the first portion of the second TTI is based at least in part on a specified retuning time among UEs.

15. The apparatus of claim 13, wherein the instructions are executable to cause the apparatus to:
- rate-match around the first portion of the second TTI.

16. The apparatus of claim 13, wherein the second portion of the second TTI is punctured by the first portion of the second TTI.

17. An apparatus for wireless communication at a user equipment (UE), comprising:
- a processor;
- memory coupled with the processor; and
- instructions stored in the memory and operable, when executed by the processor, to cause the apparatus to:
  - receive a first downlink message during a first transmission time interval (TTI) in a first frequency band of a system bandwidth;
  - determine a coverage enhancement (CE) of the UE and a number of symbols for the UE to retune based at least in part on the determined CE of the UE;
  - transmit, to a base station, signaling indicative of a retuning configuration of the UE, the retuning configuration comprising an indication of the number of symbols for the UE to retune;
  - retune a receiver from the first frequency band to a second frequency band of the system bandwidth during a first portion of a second TTI, the first portion having a duration that is based at least in part on the CE of the UE and the duration for the UE to retune indicated by the retuning configuration; and
  - receive a second downlink message during a second portion of the second TTI in the second frequency band.

18. The apparatus of claim 17, wherein the first portion of the second TTI comprises a control region and part of a data region of the second TTI.

19. The apparatus of claim 18, wherein the instructions are executable to cause the apparatus to:
- determine that the first portion of the second TTI comprises part of the second downlink message; and
- decode the second downlink message based at least in part on an assumption that the second downlink message is punctured by symbols comprising other data.

20. The apparatus of claim 17, wherein the second downlink message is rate-matched around the first downlink message.

21. The apparatus of claim 17, wherein the first portion of the second TTI comprises an initial symbol period of the second TTI, and wherein the instructions are executable to cause the apparatus to:
- receive reference signals in symbols of the second TTI other than the initial symbol period of the second TTI.

22. The apparatus of claim 21, wherein the instructions are executable to cause the apparatus to:
- perform channel estimation, frequency tracking, or time tracking using the reference signals, wherein a pattern of the reference signals is based at least in part on a designation of the second TTI as being for tuning from the first to the second frequency band.

23. The apparatus of claim 21, wherein the instructions are executable to cause the apparatus to:
- receive signaling indicating that the second TTI is designated for tuning from the first frequency band of the system bandwidth to the second frequency band of the system bandwidth.

24. The apparatus of claim 23, wherein the signaling comprises system information.

* * * * *